United States Patent
Grahn et al.

(10) Patent No.: US 11,561,100 B1
(45) Date of Patent: Jan. 24, 2023

(54) EXIT ROUTES

(71) Applicant: Allstate Insurance Company, Northbrook, IL (US)

(72) Inventors: Jamie Elizabeth Grahn, Lakemoor, IL (US); Elizabeth Schreier, Glenview, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 441 days.

(21) Appl. No.: 16/661,554

(22) Filed: Oct. 23, 2019

Related U.S. Application Data

(60) Provisional application No. 62/751,217, filed on Oct. 26, 2018.

(51) Int. Cl.
  *G01C 21/20* (2006.01)
  *H04W 4/33* (2018.01)
  *H04W 4/024* (2018.01)
  *G06V 20/10* (2022.01)

(52) U.S. Cl.
  CPC ........... *G01C 21/206* (2013.01); *G06V 20/10* (2022.01); *H04W 4/024* (2018.02); *H04W 4/33* (2018.02)

(58) Field of Classification Search
  CPC .... G06K 9/00664; H04W 4/024; H04W 4/33; G01C 21/206
  See application file for complete search history.

(56) References Cited

U.S. PATENT DOCUMENTS

| | | |
|---|---|---|
| 7,035,650 B1 | 4/2006 | Moskowitz et al. |
| 7,349,768 B2 | 3/2008 | Bruce et al. |
| 7,395,151 B2 | 7/2008 | O'Neill et al. |
| 7,865,306 B2 | 1/2011 | Mays |

(Continued)

FOREIGN PATENT DOCUMENTS

| | | |
|---|---|---|
| CN | 103985303 A | 8/2014 |
| CN | 104463361 A | 3/2015 |

(Continued)

OTHER PUBLICATIONS

Ahn, J., et al., "RescueMe: An Indoor Mobile Augmented-Reality Evacuation System by Personalized Pedometry", 2011 IEEE Asia-Pacific Services Computing Conference, Dec. 12-15, 2011, 8 pages.

(Continued)

*Primary Examiner* — Hunter B Lonsberry
*Assistant Examiner* — Harrison Heflin
(74) *Attorney, Agent, or Firm* — Polsinelli PC

(57) ABSTRACT

A computing device equipped with a camera may be used to assist a person in planning and traversing exit routes for a premises. For example, a user may be able to interact with one or more user interfaces generated by the computing device to determine an exit route for the premises. The user may be able to identify various objects, such as stairs or doors, along the exit route. The user may be able to identify graphical or textual information that can be displayed at certain points along the exit route. After determining the exit route, a data structure for the exit route may be shared with other users and/or be used to assist a user in traversing the exit route. For example, the data structure may be used as a basis for overlaying graphics and/or text on a real-time video display as the user traverses the exit route.

20 Claims, 27 Drawing Sheets

(56) References Cited

U.S. PATENT DOCUMENTS

| | | | |
|---|---|---|---|
| 8,300,560 | B2 | 10/2012 | Nowlan et al. |
| 8,422,987 | B2 | 4/2013 | Kane et al. |
| 8,433,336 | B2 | 4/2013 | Lee et al. |
| 8,639,654 | B2 | 1/2014 | Vervaet et al. |
| 8,725,404 | B2 | 5/2014 | Kmiecik et al. |
| 8,924,149 | B2 | 12/2014 | Coppens |
| 9,304,003 | B1 * | 4/2016 | Ashman ............... G01C 21/206 |
| 9,318,018 | B2 | 4/2016 | Park et al. |
| 9,541,625 | B2 | 1/2017 | McSheffrey |
| 9,683,856 | B2 | 6/2017 | Iyer et al. |
| 9,712,988 | B2 | 7/2017 | Jo et al. |
| 9,794,755 | B1 | 10/2017 | South et al. |
| 9,836,652 | B2 | 12/2017 | Lection et al. |
| 9,852,547 | B2 | 12/2017 | Bostick et al. |
| 9,852,592 | B2 | 12/2017 | McSheffrey |
| 10,718,619 | B2 * | 7/2020 | Wang ................... G06Q 10/047 |
| 2003/0210228 | A1 | 11/2003 | Ebersole et al. |
| 2013/0116922 | A1 | 5/2013 | Cai et al. |
| 2014/0295887 | A1 * | 10/2014 | Redfern ................. G01C 21/32 |
| | | | 455/456.3 |
| 2016/0035138 | A1 * | 2/2016 | Kim .......................... G06T 1/20 |
| | | | 345/633 |
| 2016/0123741 | A1 | 5/2016 | Mountain |
| 2016/0140868 | A1 * | 5/2016 | Lovett ................... G06T 19/006 |
| | | | 434/118 |
| 2016/0183055 | A1 | 6/2016 | Mahajan et al. |
| 2016/0345137 | A1 * | 11/2016 | Ruiz ...................... H04W 4/027 |
| 2017/0059343 | A1 | 3/2017 | Spinelli et al. |
| 2017/0176190 | A1 | 6/2017 | Harvey |
| 2017/0178013 | A1 | 6/2017 | Beloglazov et al. |
| 2017/0193705 | A1 * | 7/2017 | Mullins ................. G06T 19/006 |
| 2018/0032997 | A1 * | 2/2018 | Gordon .............. G06Q 30/0269 |
| 2018/0040232 | A1 | 2/2018 | Wedig et al. |
| 2019/0051054 | A1 * | 2/2019 | Jovanovic ............. G06T 19/006 |
| 2019/0128676 | A1 * | 5/2019 | Naik ....................... G06T 7/248 |
| 2019/0188977 | A1 * | 6/2019 | Moses ..................... H04L 67/18 |
| 2019/0370593 | A1 * | 12/2019 | Nakao .................... G06V 20/20 |
| 2019/0376792 | A1 * | 12/2019 | Chen ....................... A62B 99/00 |

FOREIGN PATENT DOCUMENTS

| | | | |
|---|---|---|---|
| CN | 105405333 A | 3/2016 | |
| JP | 2009175033 A | 8/2009 | |
| JP | 6075077 B2 | 2/2017 | |
| WO | WO-2013057730 A1 * | 4/2013 | ............. G01C 21/20 |

OTHER PUBLICATIONS

Module 4: "Planning an Evacuation Route Based on Hazard Information", InaSAFE.org, InaSAFE Docs, Training Materials, Copyright 2014 (last build Jun. 9, 2017), retrieved from <http://docs.inasafe.org/en/training/old-training/intermediate/qgis-inasafe/404-planning-evacuation-route.html>, 5 pages.

Bin Wang, Haijiang Li, Yacine Rezgui, Alex Bradley, and Hoang N. Ong, "BIM Based Virtual Environment for Fire Emergency Evacuation," The Scientific World Journal, vol. 2014, Article ID 589016, 22 pages, 2014. <https://doi.org/10.1155/2014/589016>.

Emergency Evacuation Simulator, Program-Ace, retrieved from <https://program-ace.com/success-stories/emergency-evacuation-simulator/>, Feb. 26, 2018, 10 pages.

* cited by examiner

EXIT ROUTES

CROSS-REFERENCE TO RELATED APPLICATIONS

The present application claims the priority benefit of U.S. provisional application No. 62/751,217. The above-mentioned U.S. provisional application is incorporated herein by reference in its entirety.

FIELD

This disclosure generally relate to devices, systems and methods for assisting a user in planning and/or practicing an exit route from a premises.

BACKGROUND

In some emergency situations, such as a fire, exiting a premises quickly may be of utmost importance. To improve the chances of exiting the premises in an emergency situation, it may be advantageous to plan and/or practice an exit route under normal environmental circumstances. The exit route, for example, may be from a person's bedroom to a predesignated location outside the premises, such as the end of a driveway. Under an emergency situation, however, a person may not remember the exit route or may fail to follow the exit route correctly. For example, a person may have not practiced the exit route enough to fully commit the exit route to memory and, therefore, may fail to exit the premises as quickly as expected or may follow a different route to exit the premises. Such failures may increase the risk to the person's safety in an emergency situation.

BRIEF SUMMARY

The following presents a simplified summary of various features described herein. This summary is not an extensive overview, and is not intended to identify required or critical elements or to delineate the scope of a future claim. The following summary merely presents some concepts in a simplified form as an introductory prelude to the more detailed description provided below.

The present disclosure describes one or more improvements related to a person's ability to plan and/or traverse an exit route for a premises. Additionally, one or more other improvements related to exit routes may be apparent upon reading and understanding the present disclosure. As one general example, the present disclosure describes the use of a computing device, which is equipped with a camera, as a way to facilitate the planning and/or traversing of one or more exit routes for a premises. In particular, a user may be able to interact with one or more user interfaces generated by a computing device to determine an exit route from a premises. The exit route may begin at a location within the premises (e.g., a bedroom), continue through the premises, exit the premises, and end at a particular location outside the premises (e.g., at the end of a driveway). The user may, based on interactions with the one or more user interfaces, be able to identify various objects, such as stairs or doors, along the exit route. The user may, based on interactions with the one or more user interfaces, be able to identify graphical or textual information that can be displayed at certain points along the exit route. After the user has finished determining the exit route, the data for the exit route may be stored for later use. Later uses of the data may include, for example, sharing the data for the exit route with other users and augmenting a real-time video display as a way to assist a user in traversing an exit route. As an example of the types of augmentations for the real-time video display, a computing device may, as the user traverses the exit route, overlay graphics or text over video data captured by the camera of the computing device. The graphics or text may indicate, among other things, a path of the exit route, the presence of doors or stairs, or a safe zone for the exit route. Further, users may, based on determining the exit route and/or traversing the exit route, be eligible for a discounted rate to a service (e.g., a discount to an insurance policy) or a discount to a product (e.g., a discount to fire safety equipment, such as a smoke detector).

These and additional features will be appreciated based on discussion of the present disclosure.

BRIEF DESCRIPTION OF THE DRAWINGS

The present invention is illustrated by way of example and is not limited by the accompanying figures in which like reference numerals indicate similar elements and in which.

DETAILED DESCRIPTION

Figure 1:
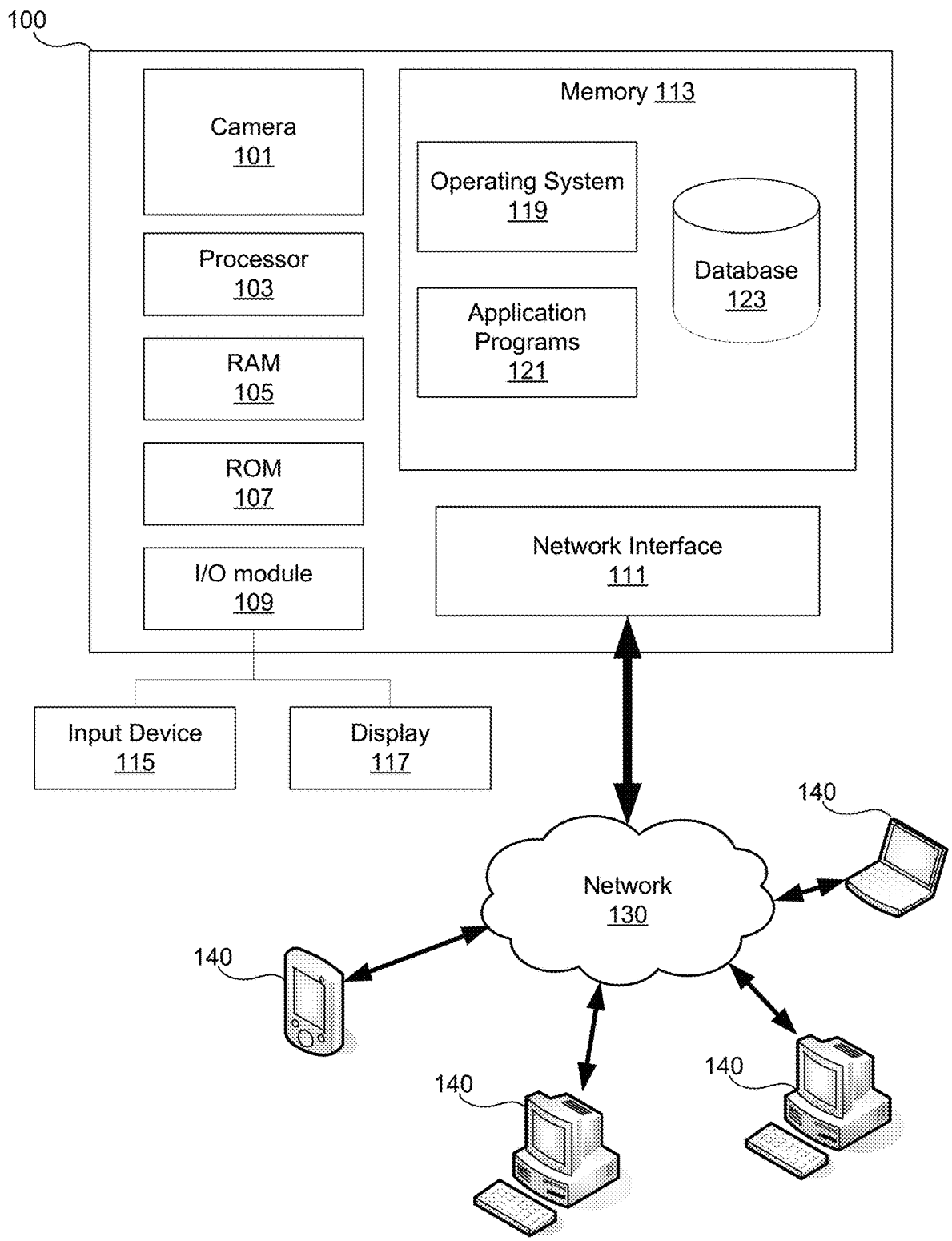
FIG. 1 shows a block diagram of an example computing device and networked computing environment, which may be used to implement one or more features described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, the present disclosure describes one or more improvements related to a person's ability to plan and/or traverse an exit route for a premises. As one general example, the present disclosure describes the use of a computing device, which is equipped with a camera, as a way to facilitate the planning and/or traversing of one or more exit routes for a premises. In particular, a user may be able to interact with one or more user interfaces generated by a computing device to determine an exit route from a premises. The exit route may begin at a location within the premises (e.g., a bedroom), continue through the premises, exit the premises, and end at a particular location outside the premises (e.g., at the end of a driveway). The user may, based on interactions with the one or more user interfaces, be able to identify various objects, such as stairs or doors, along the exit route. The user may, based on interactions with the one or more user interfaces, be able to identify graphical or textual information that can be displayed at certain points along the exit route. After the user has finished traversing the exit route, the data for the exit route may be stored for later use. Later uses of the data may include, for example, sharing the data for the exit route with other users and augmenting a real-time video display as a way to assist a user in traversing the exit route.

There are many different types of augmentations for the real-time video display that could be implemented in association with the exit route. As an example, a computing device may, as the user traverses the exit route, overlay graphics or text over video data captured by the camera of the computing device. The graphics or text may indicate, among other things, a path of the exit route, the presence of doors or stairs, or a safe zone of the exit route.

The exit route may be intended for use as an escape route when under an emergency situation. In this way, a safe zone of the exit route may be where a person can remain and wait for additional help during the emergency situation. Additionally, by practicing the exit route, a user may be more familiar with how to escape the premises during the emergency situation. Further, users may, based on determining the exit route and/or traversing the exit route, be eligible for a discounted rate to a service (e.g., an insurance policy) or a discount to a product (e.g., a discount to fire safety equipment, such as a smoke detector). The augmentations described herein, and any variation thereof, may be used as part of an augmented reality application. In addition to an augmented reality application, the various augmentations described herein, and any variation thereof, may be used as part of applications including, for example, a mixed reality application.

Computer software, hardware, and networks may be utilized in a variety of different system environments, including those discussed herein. FIG. 1 illustrates a block diagram of an example computing device 100 and networked computing environment, which may be used according to implement one or more features described herein. The computing device 100 may be similar to any available computing device, such as a personal computer (e.g., a desktop computer), server, laptop computer, notebook, tablet, smartphone, etc. The computing device 100 may have a processor 103 for controlling overall operation of the computing device 100 and its associated components, including camera 101, processor 103, Random Access Memory (RAM) 105, Read Only Memory (ROM) 107, input/output module 109, network interface 111, and memory 113. The computing device 100 may have a camera 101, or some other optical device, that captures images or records video for processing and/or storage by the computing device 100.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same apparatus or device. Using the input device 115, a user may be able to interact with various user interfaces being displayed by the display device 117 and to perform various features, such as the determining of an exit route, described in greater detail throughout this disclosure.

The memory 113 may be any computer readable medium for storing computer executable instructions (e.g., software). The executable instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN). For example, the network may include one or more of a variety of networks, such as the Internet, a cellular network, satellite network, or public switched telephone network. Through the network 130, the computing device 100 may communicate with one or more other computing devices 140, such as laptops, notebooks, smartphones, personal computers, servers, etc. The one or more other computing devices 140 may also be configured in a similar manner as computing device 100.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16, etc. In some embodiments, the network interface 111 may include a modem. Further, the network interface 111 may use various protocols, including TCP/IP, Ethernet, File Transfer Protocol (FTP), Hypertext Transfer Protocol (HTTP), etc., to communicate with other computing devices 140. In some embodiments, the computing device may include multiple network interfaces 111 for communicating using different protocols or standards or over different networks.

FIG. 1 is an example embodiment of a computing device 100. In other embodiments, the computing device 100 may include fewer or more elements. For example, the computing device 100 may include additional sensors or components, such as a fingerprint sensor. The computing device 100 may be a mobile device (e.g., a smartphone, tablet, etc.), and may also include various other components, such as a battery, speaker, and/or antennas (not shown).

Figure 2:
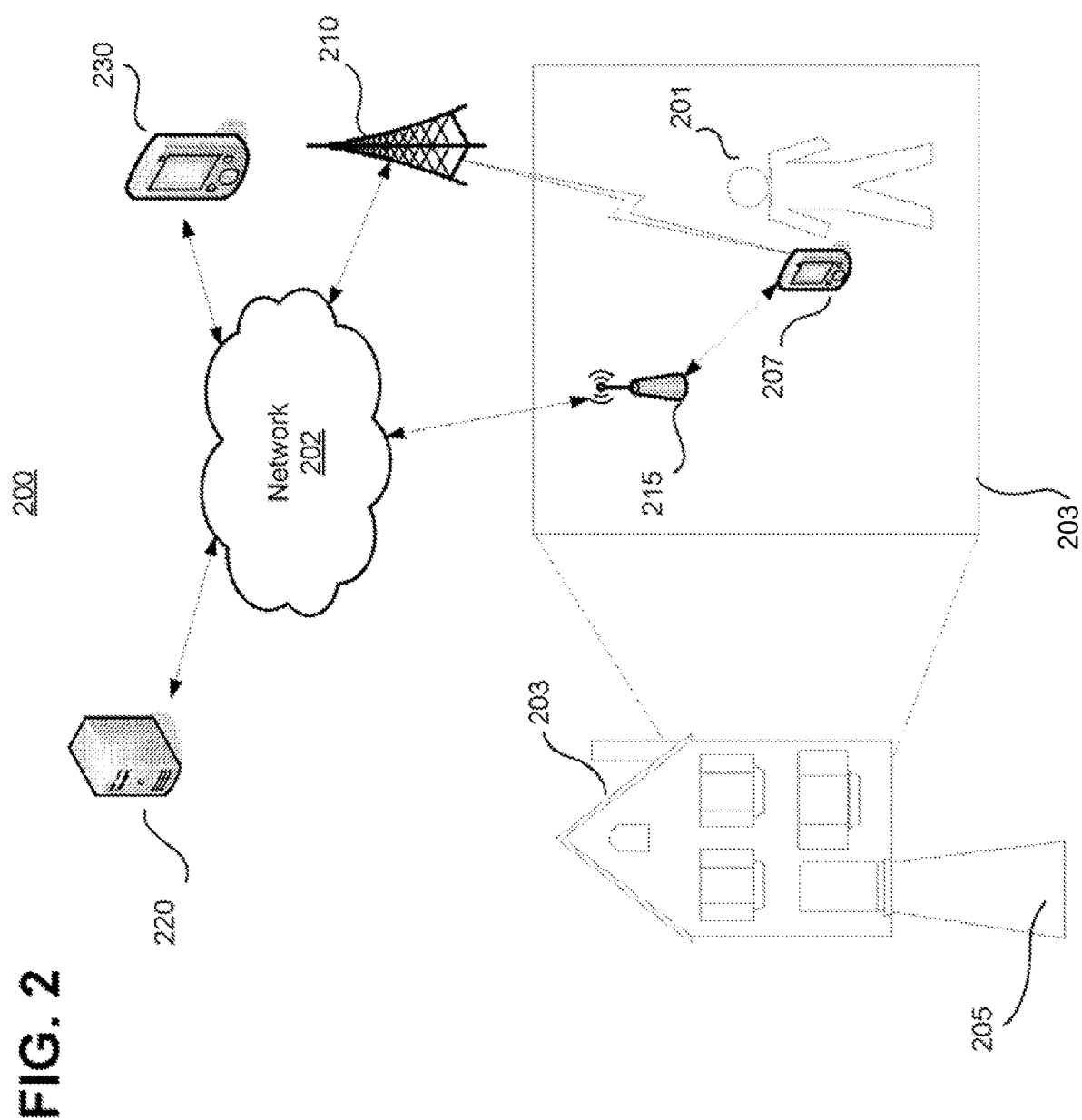
FIG. 2 shows an example network environment in which one or more features described herein may be implemented.

FIG. 2 shows an example network environment 200 in which one or more features described herein may be implemented. As shown in FIG. 2, the network environment 200 may include a network 202 configured to connect computing devices (e.g., mobile computing device 207), one or more servers 220, and one or more other computing devices (e.g., mobile computing device 230). Collectively, these computing devices may be used as part of a system that assists one or more users in determining, sharing and traversing of exit routes.

The network 202 may be any type of network, like the network 130 described above, and use one or more communication protocols (e.g., protocols for the Internet (IP), Bluetooth, cellular communications, satellite communications, etc.) to connect computing devices 207, 230 and servers 220 within the network environment 200 so they may send and receive communications between each other. For example, the network 202 may include a cellular network (e.g., Global System for Mobile Communications (GSM) network) and its components, such as base stations, mobile switching centers (MSC), and cell towers. Accordingly, for example, the mobile computing device 207 (e.g., a smartphone) may send a cellular signal to a nearby cell tower 210. The cell tower 210 may relay the cellular signal to another device of the cellular backhaul. The data of the cellular signal may be decoded/demodulated and converted to a different format (e.g., an Internet Protocol (IP) version 4 packet or IP version 6 packet), which may be routed over the network 202 and eventually received by the server 220 (or some other computing device). As another example, the network 202 may include a gateway device 215 (e.g., a modem) or some other access point that provides access to the network 202. Accordingly, for example, the mobile computing device 207 may send a signal (e.g., WiFi signal) compatible with the gateway device 215. The gateway device 215 may forward the data for relay over the network 202 and eventual receipt by the server 220 (or some other computing device).

FIG. 2 also shows that mobile computing device 207, user 201 and gateway device 215 are located at or within premises 203 (e.g., a business, home, or other type of building). The premises 203 may include one or more floors, one or more stairwells, one or more interior doors, one or more exterior doors, and one or more rooms. The user 201 may desire to determine, share and/or traverse an exit route from the premises 203. For example, the user 201 may want to determine, share and/or traverse an exit route that is intended to be the route taken during an emergency situation, such as if the premises 203 is on fire. The exit route may begin at some location within the premises 203, such as a bedroom, and may end at some location outside of the premises 203, such as location 205, which may be an area of a driveway of the premises 203. The mobile computing device 207 may be configured (e.g., via an installed application) to assist the user in determining, sharing and/or traversing an exit route.

For example, the user 201 may cause an application to be activated or loaded by the mobile computing device 207. The application may generate a number of user interfaces that allow the user 201 to, among other things, access previously-determined exit routes, to access previously-shared exit routes, and to determine a new exit route. In general, the user 201 may use the application to determine an exit route by interacting with the user interfaces as the user traverses the intended path of the exit route. Some of the interactions the user 201 may perform in connection with determining the exit route include, for example, identifying a beginning location for the exit route, identifying a path of the exit route, and identifying a safe zone for the exit route. Additionally, because the exit route may be traversed over more than one floor of the premises 203, and/or through one or more doors of the premises 203, the user 201 may interact with the user interfaces to identify stairwells, doors, or other objects along the exit route. Further, because it may be helpful to provide a person with additional information as the exit route is traversed, the user may interact with the user interfaces to associate textual or graphical information that, when traversing the exit route, may be displayed as an overlay or other augmentation to a real-time video display. The details of these, and others, will be discussed throughout the examples described throughout this disclosure.

While the details of one or more processes for determining an exit route—including details related to how the user 201 interacts with the user interfaces to determine an exit route—will be discussed below, the end result may be the generation of a data structure that defines the exit route. The data structure may be usable so a person, such as user 201, can later traverse the exit route while being assisted by a computing device, such as the mobile computing device 207. The assistance may be in the form of an augmentation to a real-time video display. The real-time video may be captured by the camera of the computing device as the person traverses the exit route. As an example of the types of augmentations for the real-time video display, a computing device may, as the person traverses the exit route, overlay graphical or textual information over image or video data of the real-time video display. Further, the data structure may be shared so other devices may be used to assist in traversing the exit route. The following table includes an example of the types of data that may be included in a data structure for an exit route.

TABLE 1

| Example Type of Data for an Exit Route | Example Description and/or Usage of the Type of Data |
|---|---|
| An image indicating a beginning location for the exit route | The image may include image data captured by a camera of a computing device that was used to determine the exit route. As one particular example, if the beginning of an exit route is a bedroom, the image may be of a door exiting the bedroom. A user, when practicing the exit route, may be prompted to point and reposition the camera and/or them self until the image captured by the camera and this image match. |
| A set of data points for a path of the exit route | Each data point in the set of data points may be a tuple, or a three-dimensional (3D) data point, relative to the initial location of the path of the exit route (e.g., (x, y, z) relative to an initial location of (0, 0, 0)). When the user is determining the exit route, the set of data points may be collected based on a user's continual pressing down onto the touch screen of the mobile computing device. When practicing the exit route, the set of data points may be used to generate a graphical overlay that indicates a direction along the path of the exit route. |
| Data indicating one or more objects that occur along the path of the exit route | The one or more objects may include stairs, doors, or other obstacles that are present along the path of the exit. Each object may include an object type (e.g., door, stairwell, etc.); one or more associated locations along the path of the exit route (e.g., one or more data points from the set of data points); and information associated with the door (e.g., assistance information, described below). When the user is determining the exit route, the user may identify presence of a stairwell or a door and the stairwell or door, and may indicate text or graphics to display with the identified stairwell or door. When the user is practicing the exit route, a graphical overlay may be displayed to highlight the stairwell or door, and any associated text or graphics may be displayed. |
| A set of assistance information indicating information to display along the path of the exit route | The set of assistance information may include graphics or text to display along the path of the exit route. The assistance information may be associated with particular objects and/or particular locations along the path of the exit route. The assistance information may include information indicating a safe zone for the exit route. A safe zone of the exit route may be where a person can remain and wait for additional help during the emergency situation. When the user is determining the exit route, the user may input or select text or graphics for use as the assistance information and may cause the assistance information to be associated with an object or location along the path of the exit route. When the user is practicing the exit route, the text or graphics may, based on any associated object or location, be displayed. |
| Name of the exit route | A textual identifier for the exit route. The user that determines the exit route may provide the text for the name. The name may be used when exit routes are listed in a user interface. |
| One or more | The properties may include an estimated total distance for the exit route (e.g., the distance required to traverse |

TABLE 1-continued

| Example Type of Data for an Exit Route | Example Description and/or Usage of the Type of Data |
|---|---|
| properties associated with the exit route | from the beginning location of the exit route to an end location of the exit route); an estimated time to complete the exit route (e.g., by multiplying the estimated total distance by an estimated time for a child or an adult to move a single unit of the distance); a count of tips or other information that is associated with the exit route (e.g., a count of the items in the set of the assistance information), and the like. The one or more properties may be determined, based on other information included in the data structure, by the mobile computing device 207 or the server 220. Additionally, various user interfaces may include indications of the one or more properties. |

In connection with determining an exit route and/or generating the data structure for the exit route, the application, via the user interfaces, may prompt the user 201 to perform various actions with the mobile computing device 207 or the user interfaces. For example, the application, via the user interfaces, may prompt the user 201 to use the camera of the mobile computing device 207 and capture an image of a beginning location of the exit route. As one particular example, if the beginning of the exit route is a bedroom, the image may be of a door exiting the bedroom. The application, via the user interfaces, may prompt the user 201 to accept the image as the beginning of the exit route. The application, via the user interfaces, may prompt the user 201 to point the camera of the mobile computing device 207 towards the floor and may prompt the user to press down on the touch screen of the mobile computing device 207 when the user 201 is ready to begin traversing through the premises 203 to define a path of the exit route. The application, via the user interfaces, may prompt the user 201 to maintain the press on the touch screen as the user 201 traverses through the premises to define the path of the exit route. The application, via the user interfaces, may prompt the user 201 to indicate various objects along the exit route, such as a door or a stairwell. The application, via the user interfaces, may prompt the user 201 to indicate various types of assistance information, such as textual tips or graphical icons that may assist a person when proceeding along the exit route. The application, via the user interfaces, may prompt the user 201 to indicate a safe zone for the exit route. These and other prompts will be discussed below.

The application may also perform (or cause to be performed) image analysis/processing on data captured by the camera of the computing device. The image analysis may be performed to determine various properties of the image or video data being captured by the camera. For example, the image analysis may be performed to indicate presence of a floor or the ground within a current image. The image analysis may also identify and/or track other types of objects within video data. Further, image processing may be performed to, for example, overlay graphics or text over real-time video being captured by the device's camera.

The image analysis/processing may be performed based on a specially designed algorithm (e.g., an edge-based or template-based image analysis algorithm) or may be performed based on off-the-shelf image analysis software, such as one provided by an operating system of the computing device (e.g., ARKit for iOS by APPLE, INC). If certain off-the-shelf image analysis software is used, the application may interface with the off-the-shelf image analysis software instead of directly interfacing with the device's camera. For example, ARKit by APPLE, INC., performs motion tracking, camera scene capture, advanced image processing, and display features. The application may interface with ARKit (e.g., using the ARKit application programming interface (API)) to cause the computing device to identify and track certain types of objects within the image or video data, to track the device's location within the physical world, and/or to cause the display of graphical or textual information as an overlay to the real-time video display.

Additional details regarding determining an exit route are provided below in connection with FIGS. 3A-3E and 4A-4G.

After determining an exit route, the mobile computing device 207 may have generated a data structure for the exit route. The data structure may include data that collectively defines the exit route. The user 201 may be able to perform various actions based on the data structure including, for example, editing the exit route, deleting the exit route, sharing the exit route with other users/devices, or augmenting a real-time video display as a way to assist in traversing the exit route. Editing the exit route may include allowing the user 201 to replace previously saved data points with new data points. Further, editing the exit route may include allowing the user 201 to identify one or more segments formed by the data points and replacing the one or more segments with new segments. In this way, previously saved data points may be replaced with new data points.

With respect to sharing the exit route with other users/devices, the user 201 may cause the mobile computing device 207 to send the data structure to device 230. Upon receipt, device 230 may store the data structure. The device 230 may be installed with a similar application that allow a user to, among other things, access previously-determined exit routes, to access previously-shared exit routes, and to determine a new exit route. Thus, based on the data structure, the exit route determined at mobile computing device 207 may appear as one of the previously-shared exit routes. A user of device 230 may be able to perform various actions with the previously-shared exit routes, including editing the exit route, deleting the exit route, and traversing the exit route. Further details regarding the sharing of an exit route are provided below in connection with FIGS. 6A-6B and 7A-7C.

Additionally, instead of sending the data structure to the device 230 directly, the mobile computing device may send the data structure to the server 220. The server 220 may store the data structure and may associate the data structure with a profile that indicates which users or devices have been given access to the data structure. Accordingly, if the user 201 shares the data structure with the device 230, the mobile computing device 207 may transmit an indication that the data structure is to be shared with the device 230. The profile may be updated to indicate that the device 230 has access to the data structure. Thereafter, based on the user of the device 230 activating or loading the application on the device 230, the server may send the data structure to the device 230, along with any other data structures for exit routes that have been shared with the device 230.

With respect to traversing the exit route, the user 201 may desire to traverse the exit route with the assistance of the mobile computing device 207. The user 201 may select the exit route to traverse based on a listing of exit routes that were previously-determined at or previously-shared with the mobile computing device 207. When traversing a selected exit route, the user 201 may view a real-time video display that is being captured by the camera of the mobile computing device 207. The real-time video display may be overlaid or otherwise augmented with graphics or text that assist the user in traversing the selected exit route. The overlays and other augments to the real-time video display may be based on the data structure for the selected exit route. For example, the real-time video display may, via overlays or other augments, indicate a direction along the path of the selected exit route; indicate the presence of a door, stair, or other object along the path of the selected exit route; or indicate assistance information associated with the selected exit route. Upon completion of exit route, the mobile computing device 207 may transmit an indication that the exit route was completed to the server 220. Further details regarding the traversing of an exit route are provided below in connection with FIGS. 8A-8B and 9A-9B.

The server 220 may be configured to receive and/or store data structures for exit routes. The server 220 may be configured to manage profiles that indicate which devices or users are able to access the data structures for the exit routes. Additionally, the server 220 may be configured to process the data structures to determine various properties associated with an exit route. For example, the server 220 may process a data structure to determine an estimated total distance for the exit route (e.g., the distance required to traverse from the beginning location of the exit route to an end location of the exit route). The server 220 may process a data structure to determine an estimated time to complete the exit route (e.g., by multiplying the estimated total distance by an estimated time for a child or an adult to move a single unit of the distance). As one particular example for determining a time to complete, if the estimated total distance of the exit route is 300 feet, and it takes a child 0.2 seconds to move a foot at a walking pace, the estimated time to complete may be 60 seconds. The server 220 may process a data structure to determine a count of tips or other information that is associated with the exit route (e.g., a count of the items in the set of the assistance information). The server 220 may be able to respond to requests or other messages sent from the devices, such as a request to edit, delete or share an exit route, and the server 220, as a response, may make the corresponding edit, deletion or share to the data structure of the exit route. Some of the above-mentioned processes that are performed by the server 220 are to conserve battery of the devices 207 and 230. Accordingly, some or all of those processes may be performed by the mobile computing device 207 or the device 230, instead of the server 220. These properties, once determined, may be stored as part of the data structure for the exit route.

Additionally, the server 220 may be configured to determine an eligibility for a discount. The discount may be to reduce the price or cost of a service or a product, such as a discount to reduce the premium of an insurance policy or a discount to reduce the purchase price for fire safety equipment. Further, for the user 201 to be eligible for the discount, the user 201 may be required to determine and/or traverse one or more exit routes. For example, the server 220 may monitor for newly-determined exit routes and/or for the completion of exit routes. If the mobile computing device 207 transmits the data structure for an exit route to the server 220, and if the mobile computing device 207 later transmits an indication that the exit route was completed, the server 220 may determine that the user 201 is eligible for the discount. Accordingly, the server 220 may transmit message to a billing server (not shown) that causes, for example, the discount to be applied to the insurance policy of the user 201 or to be applied to a transaction for purchasing fire safety equipment. Applying the discount may take the form of a credit to an account associated with the user 201. In this way, the credit can be used at a later time by the user 201 when, for example, purchasing a desired item of fire safety equipment. Further details regarding the processes that may be performed by the server 220 will be discussed throughout the below examples.

To provide one or more examples of how the mobile computing device 207 may determine an exit route, an example method flow, as shown at FIGS. 3A-3E, will be discussed in view of a number of example user interfaces, as shown at FIGS. 4A-4G. The example, in particular, is directed at a user 201 using the mobile computing device 207 to determine an exit route from premises 203. Further, for the example method flow discussed in view of FIGS. 3A-3E and FIGS. 4A-4G, any image analysis/processing may be performed based on ARKit, which may be executing on the mobile computing device 207.

The example method flow begins at 301 where the user 201 causes the mobile computing device 207 to activate or load an application that allow the user 201 to, among other things, access previously-determined exit routes, to access previously-shared exit routes, and to determine a new exit route. The user 201 may cause activation or loading of the application by interacting with the operating system of the mobile computing device 207 to locate an icon for the application and then pressing on the icon for the application.

Figure 3A:
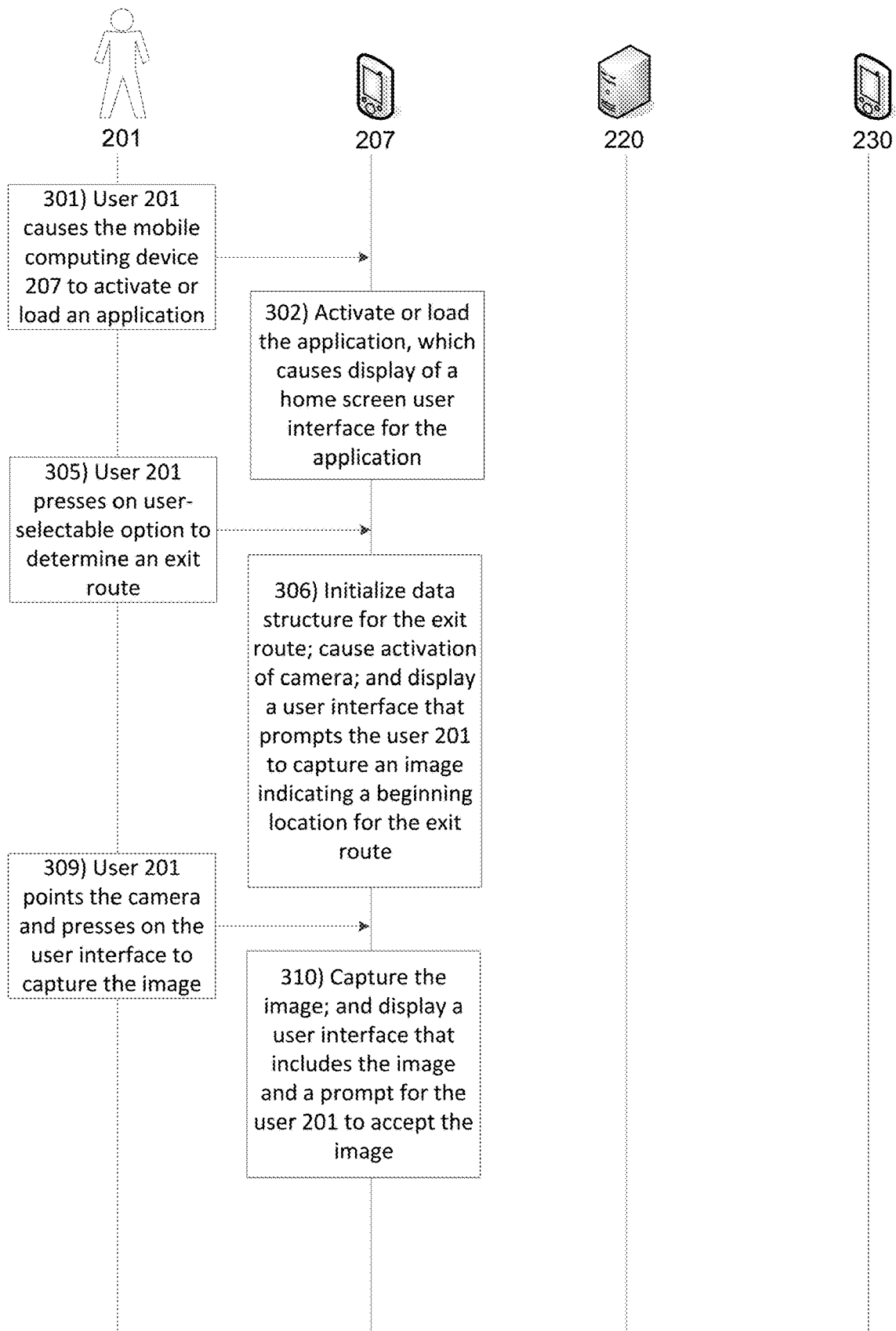
FIGS. 3A-3E show one or more example method flows that include determining an exit route.
Figure 4A:
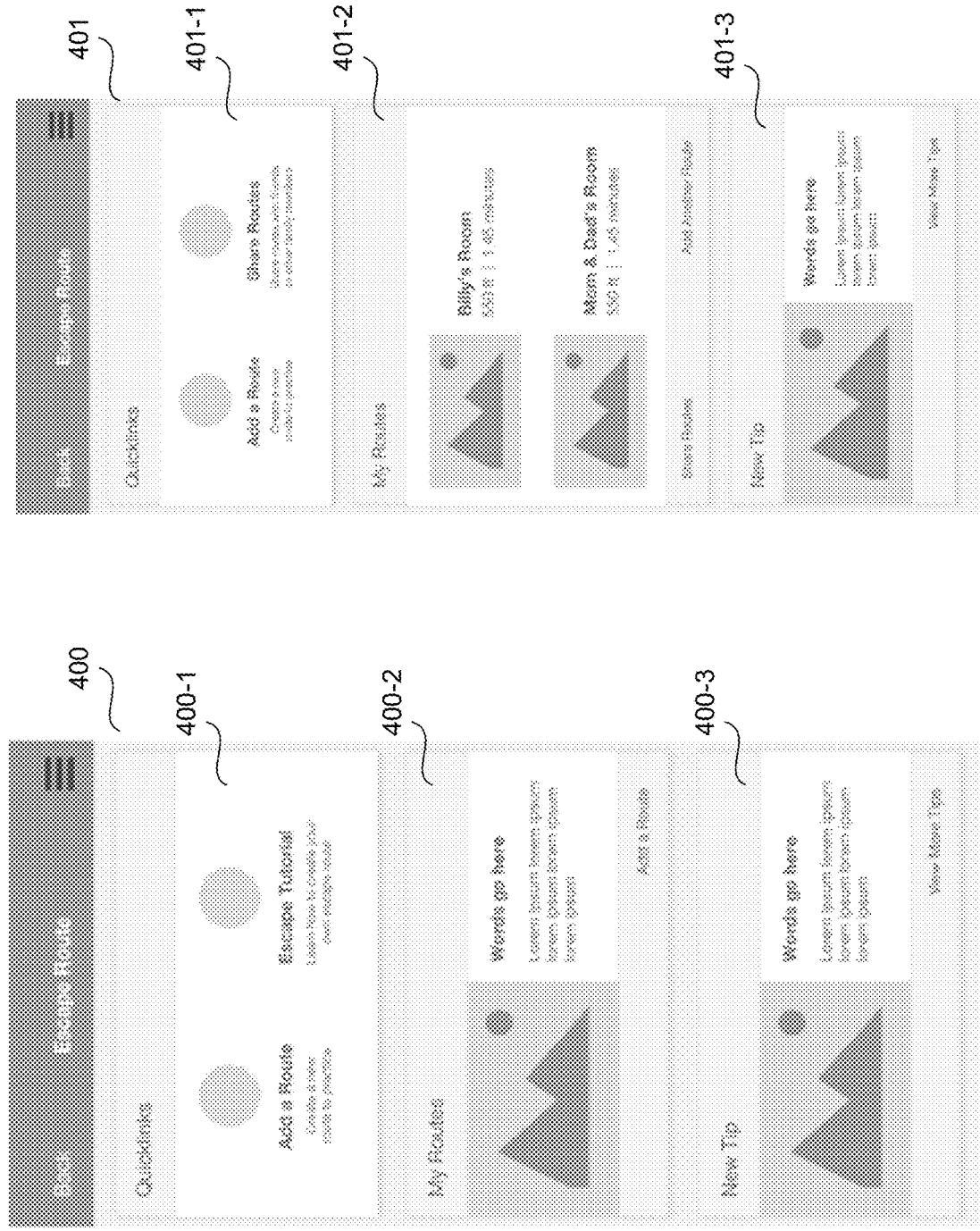
FIGS. 4A-4G show one or more example user interfaces that may be used in connection with a process for determining an exit route.

At 302 of FIG. 3A, the mobile computing device 207 may activate or load the application. Activation of loading of the application may cause, for the application, display of a home screen user interface. FIG. 4A shows two example home screen user interfaces 400 and 401. The first example home screen user interface 400 includes an area 400-1 that includes user-selectable options for adding an exit route and entering a tutorial for learning how to determine an exit route. The first example home screen user interface 400 also includes an area 400-2 for listing exit routes that have been determined by the mobile computing device 207 or have been shared with the mobile computing device 207. The first example home screen user interface 400 also includes an area 400-3 for listing tips related to exit routes. Such tips may include an indication of how long it should take to complete an exit route, a reminder to have children practice exit routes with adults, and the like.

The second example home screen user interface 401 include an area 401-1 that includes user-selectable options for adding an exit route and entering a tutorial that, for example, provides helpful information regarding an exit route and the manner in which an exit route may be determined, shared and traversed. The second example home screen user interface 401 also includes an area 401-2 for listing exit routes that have been determined by the mobile computing device 207 or have been shared with the mobile computing device 207. As shown, the area 401-2 includes two exit routes: a first exit route titled "Billy's Room" and a second exit route titled "Mom & Dad's Room". The user 201 may be able to select either of the entries for the two exit routes to view additional information and/or options associated with the exit route. The second example home screen user interface 401 also includes an area 401-3 for listing tips related to exit routes.

Figure 4B:
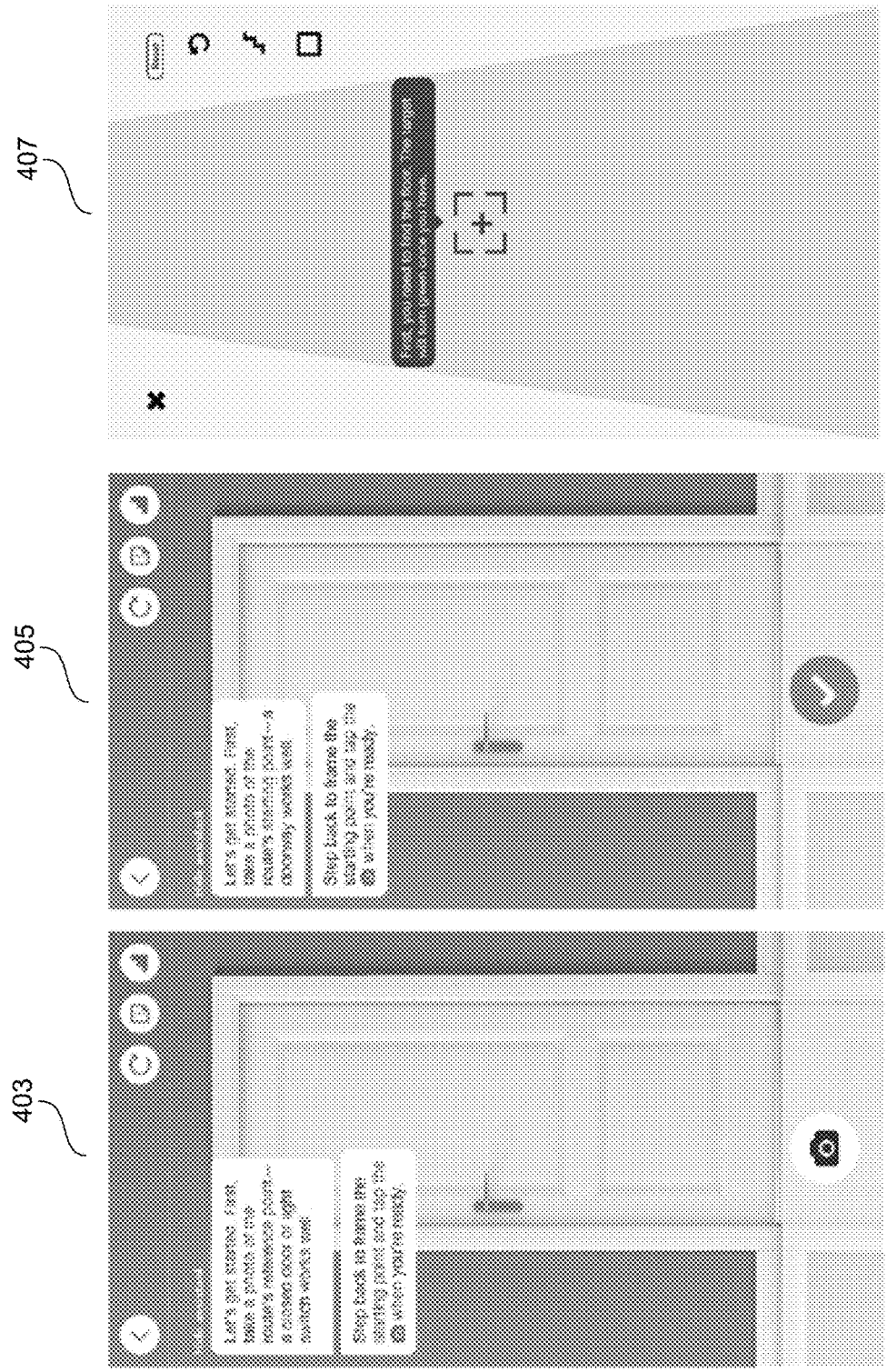

At 305 of FIG. 3A, the user 201 may press on the user-selectable option to determine an exit route (e.g., the user selectable option in area 401-1 labeled "Add a Route"). At 306, based on the selection to determine an exit route, the mobile computing device 207 may initialize a data structure for the exit route, cause activation of the camera of the mobile computing device, and may display a user interface that prompts the user 201 to capture an image indicating a beginning location for the exit route. FIG. 4B shows one example user interface 403 that prompts the user 201 to capture an image indicating a beginning location for the exit route. The example user interface 403 indicates that the user 201 is to capture an image indicating a beginning location for the exit route; indicates that certain objects are suitable for inclusion within the image (e.g., a closed door or a light switch); indicates that the user 201 may need to reposition them self (e.g., by stepping back) to frame the image; and includes a button that causes the camera to capture an image. The mobile computing device 207 may also prompt the user to provide a name for the exit route (not shown). The name may be stored within the data structure.

At 309 of FIG. 3A, the user 201 may point the camera to capture an intended image and may press on the user interface to capture the image. At 310, the mobile computing device 207 may capture the image, and may display a user interface that includes the image and prompts the user 201 to accept the image. FIG. 4B shows one example user interface 405 that displays the image and prompts the user 201 to accept the image by pressing on the button indicated by the check mark.

Figure 3B:
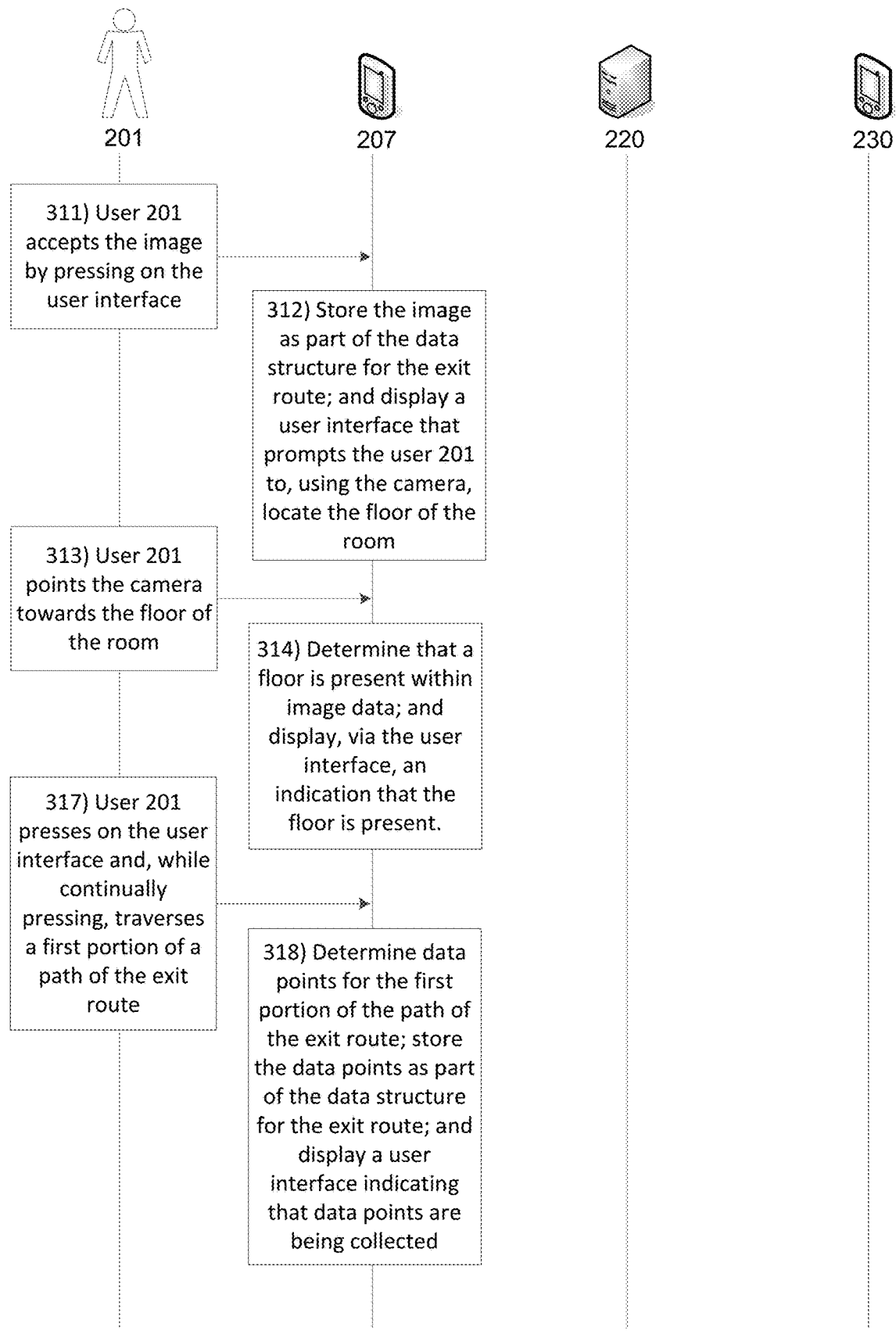

At 311 of FIG. 3B, the user 201 may accept the image by pressing on the user interface. At 312, the mobile computing device 207 may store the image as part of the data structure for the exit route, and may display a user interface that prompts the user 201 to locate the floor of the room with the camera. FIG. 4B shows one example user interface 407 that prompts the user 201 to locate the floor of the room with the camera.

At 313 of FIG. 3B, the user 201 may point the camera towards the floor of the room. At 314, the mobile computing device 207 may determine that a floor is present within image data, and may display, via the user interface, an indication that the floor is present. The user interface 407 of FIG. 4B provides one example of an indication that the floor is present. As shown in the user interface 407, when the floor is present, the target reticule will turn green.

Figure 4C:
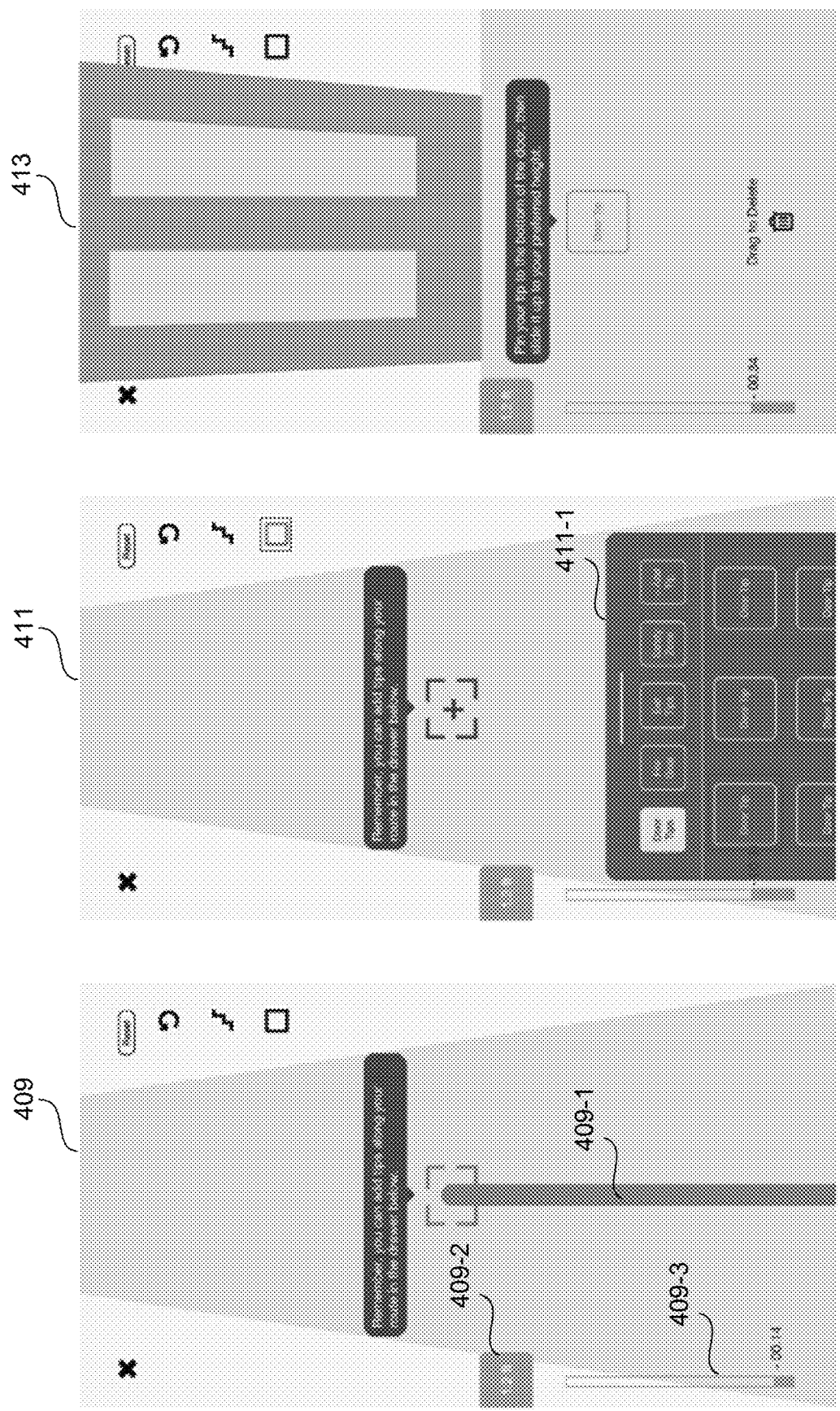

At 317 of FIG. 3B, the user 201 may press on the user interface (e.g., press on the target reticle of user interface 407) and, while continually pressing down on the user interface, may traverse a first portion of a path of the exit route. The first portion of the path of the exit route may include, for example, exiting the original room (e.g., a bedroom of the premises 203), moving through a hallway of the premises 203, and through another room of the premises 203. At 318, the mobile computing device 207 may determine data points for the first portion of the path of the exit route, may store the data points in the data structure for the exit route, and may display a user interface indicating that data points are being collected. FIG. 4C shows one example of a user interface 409 that includes an indication that data points are being collected. As shown by the user interface 409, a path 409-1 indicates that data points are being collected. The user interface 409 may also indicate that the floor is present (e.g., by having the target reticle be a color, such as green or blue). The user interface 409 may also indicate a reminder that tips or objects may be added along the route. This reminder may be displayed based on determining that the user 201 is traversing inside the premises 203.

The data points may be determined based on a mechanism that allows the current 3D position of the mobile device to be tracked. As one example, ARKit may provide the data points. The data points may each be a 3D coordinate that is in relation to the initial data point. In this way, the set of data points stored in the data structure may indicate, for the path of the exit route, distance traveled, elevation gained or lost, and the like. Additionally, the mobile computing device 207 may process the data points to, for example, determine an estimated distance from the initial data point and determine an estimated duration of travel for the estimated distance. The mobile computing device 207 may further display the estimated distance and the estimated duration in the user interface. Indeed, the user interface 409 includes an indicating 409-2 of the estimated distance and an indication 409-3 of the estimate duration.

Additionally, as the user 201 traverses the path of the exit route, the user 201 may be required to maintain the camera pointed at the floor or the ground. If the floor or the ground are no longer present, the mobile computing device 207 may display, via the user interface, an indication that the floor or the ground are not present (e.g., by turning the target reticle of the user interface 409 of FIG. 4C to black). An audible warning indicating the floor or ground is not present may also be generated by the mobile computing device 207. If the floor or the ground are not present within image data, the mobile computing device 207 may not collect data points.

At some point, the user 201 may desire to indicate presence of an object along the path of the exit route, or may desire to add assistance information for the exit route. Thus, at 321, the user 201 may cease pressing on the user interface and may stop traversing the path of the exit route. At 322, based on the cease in the pressing, the mobile computing device 207 may stop collecting data points.

At 325, the user 201 may interact with the user interface to select an object to identify along the path of the exit route, and/or may interact with the user interface to add assistance information for the exit route. At 326, the mobile computing device 207, based on the user interactions, may store, as part of the data structure, data indicating one or more objects that are along the path of the exit route and/or assistance information. As discussed above, objects may include stairs, doors, or other obstacles that are present along the path of the exit route; and assistance information may include graphics or text to display along the path of the exit route.

Figure 3C:
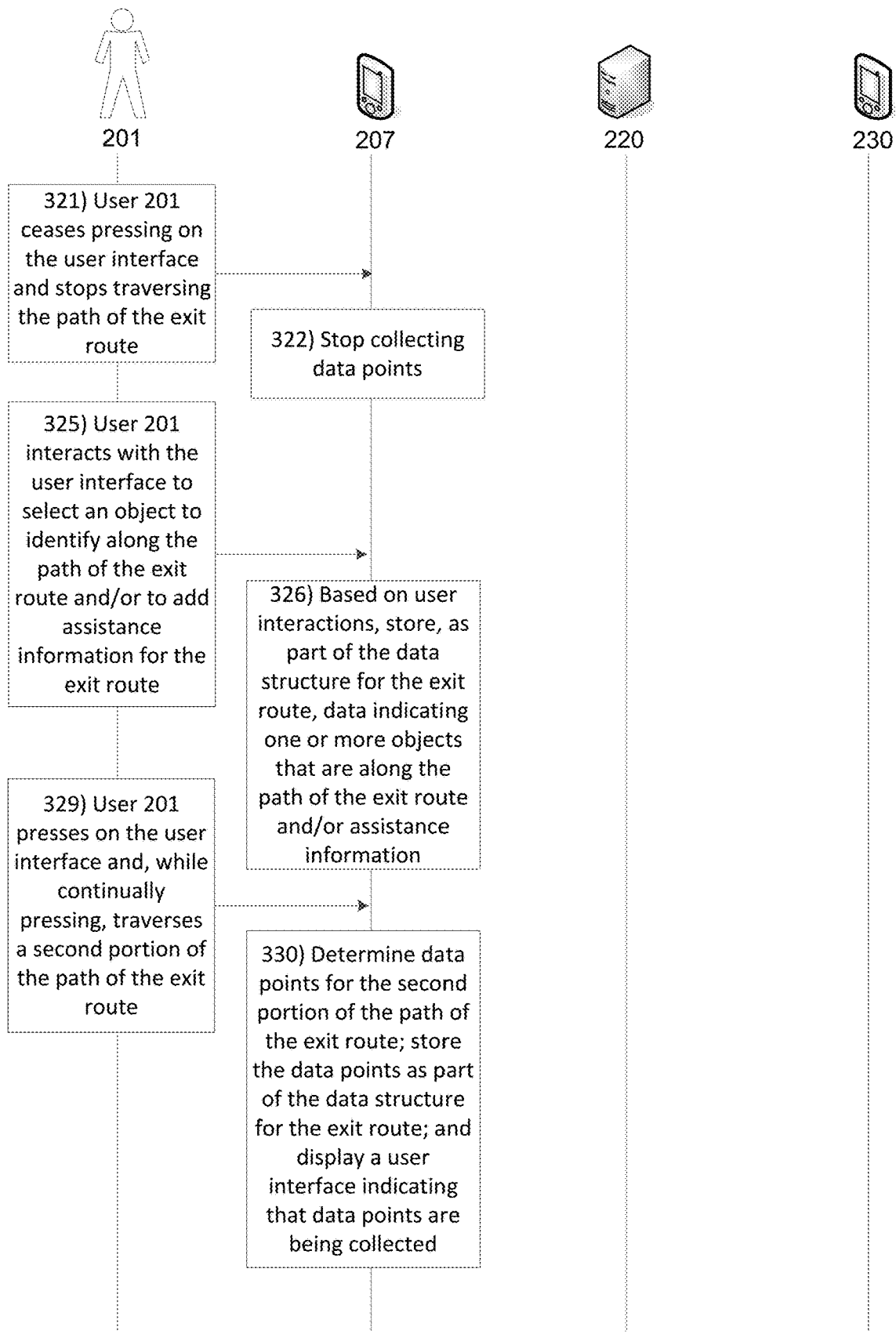
Figure 3D:
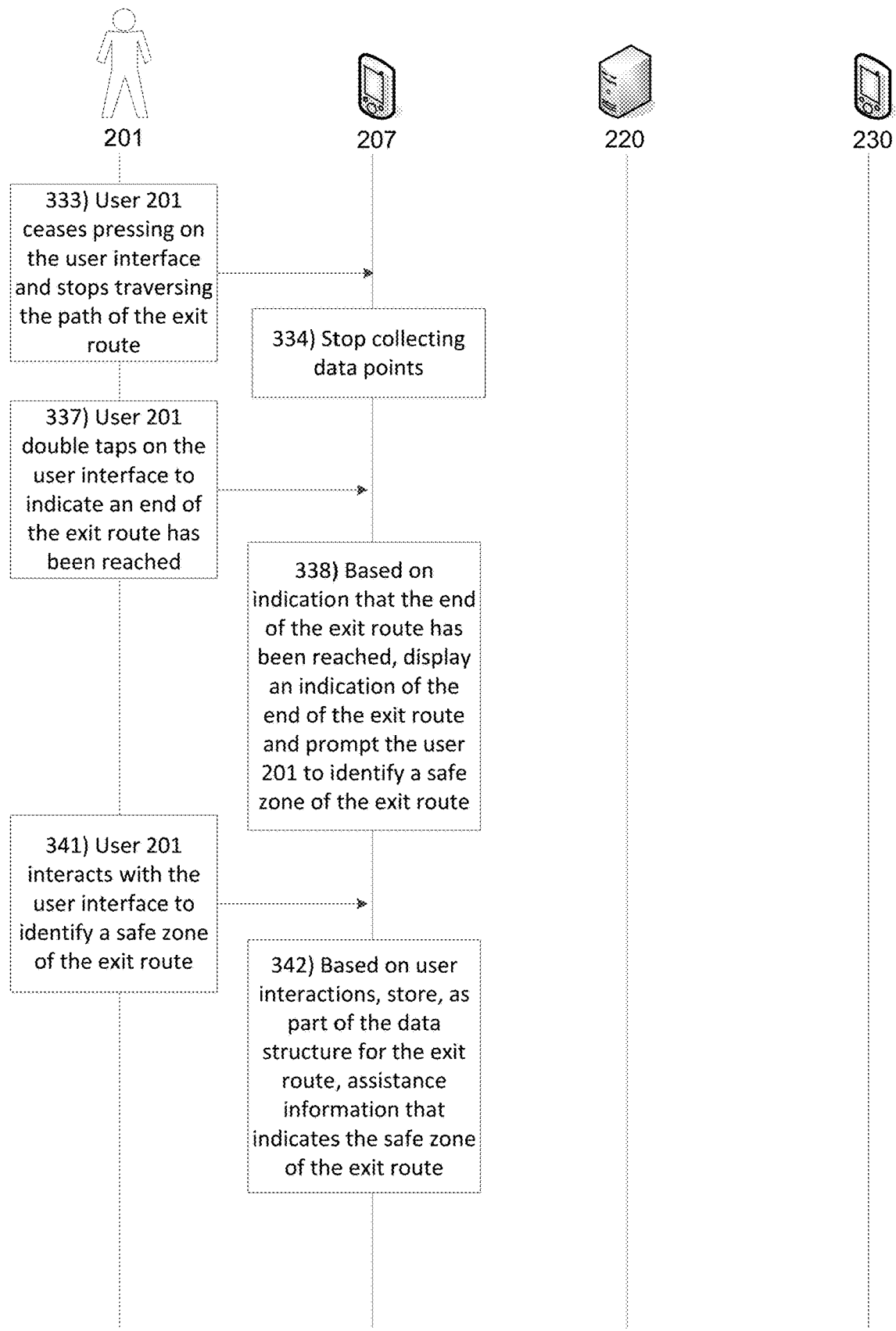
Figure 4D:
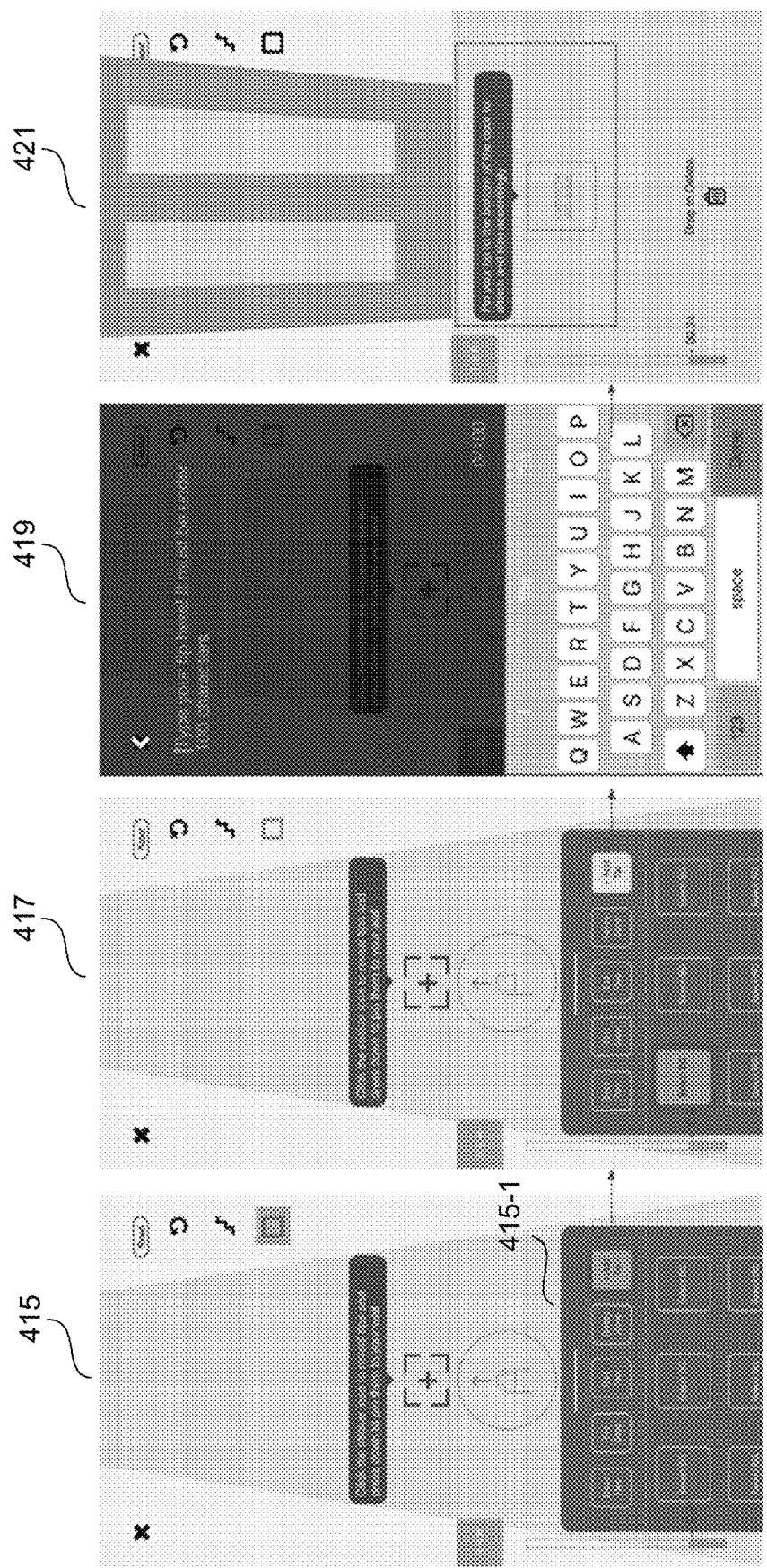
Figure 4E:
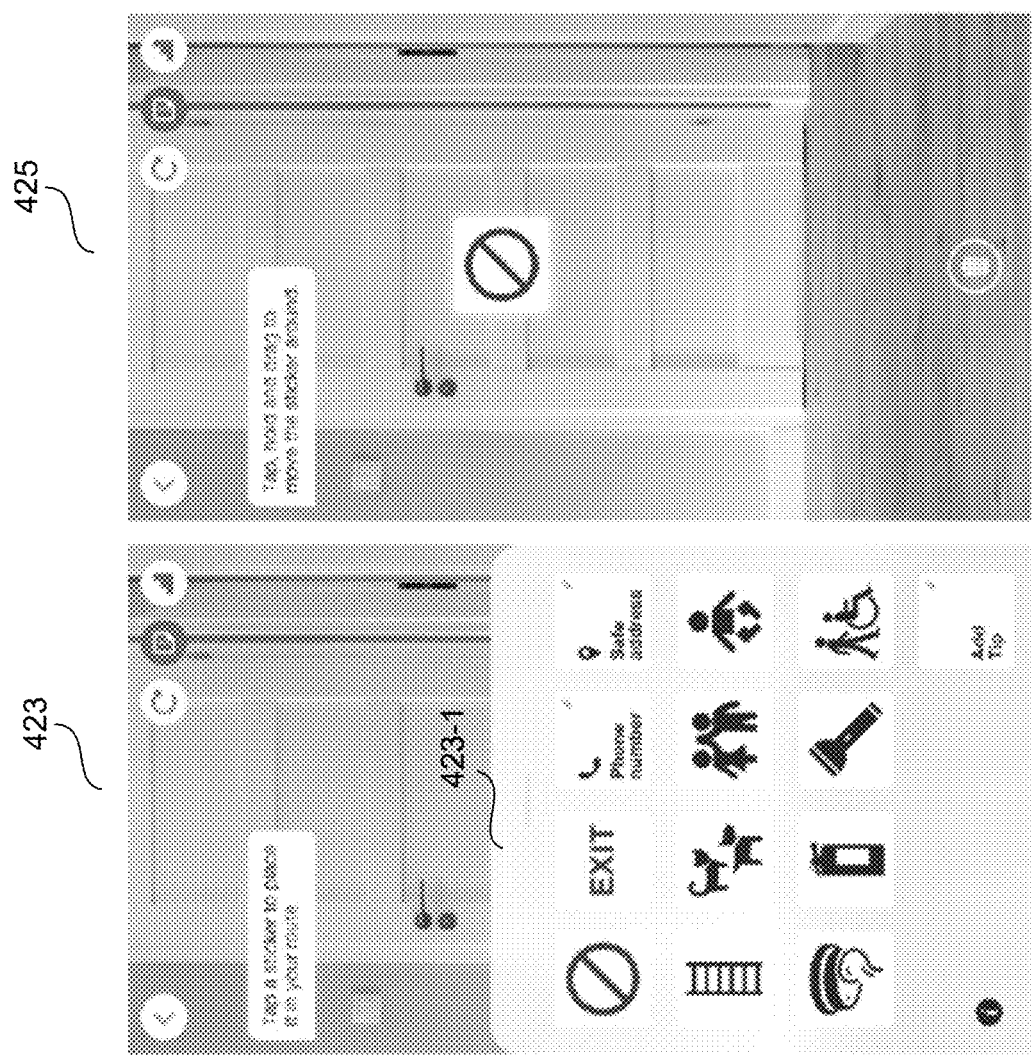

While not explicitly shown in the steps of FIG. 3C, in connection with steps 325 and 326, the user 201 may interact with different user interfaces generated by the mobile computing device 207. For example, the mobile computing device 207 may generate particular user interfaces for identifying a door, may generate particular user interfaces for identifying a stairwell, and the like. Additionally, the mobile computing device 207 may generate particular user interfaces for adding assistance information for the exit route. User interfaces 411-425 of FIGS. 4C-4E provide examples of the types of user interfaces that may be generated to allow the user 201 to identify an object or add assistance information.

User interfaces 411 and 413 provide an example that allows the user 201 to identify a door along the path of the exit route. In particular, user interface 411 includes an area 411-1 that includes a number of preconfigured door tips. Each of the preconfigured door tips, for example, may be a graphical icon or text indicating whether the door should be opened, proceeded through, shut or the like. The user 201 may select one of the preconfigured door tips to add along the exit route and associate with a door object. User interface 413 indicates that the user 201 has selected one of the door tips and prompts the user to move the door tip to a display height. Upon the user 201 interacting with the user interfaces 411 and 413 to select the door and place the door tip at the desired height, the mobile computing device 207 may store, as part of the data structure for the exit route, data indicating the door that includes an indication that the object type is a door; a location associated with the door (e.g., the last collected data point); and assistance information for the door tip that indicates which preconfigured door tip was selected, and a display height for the door tip.

User interfaces 415-421 provide an example that allows the user 201 to identify a door along the path of the exit route and input text that is associated with the door as assistance information. In particular, user interface 415 includes an area 415-1 that includes a user selectable option to add a new door tip, and a number of available backgrounds or icons for the new door tip. The selectable option to add a new door tip may allow the user 201 to input text to display in association with a door. User interface 417 indicates that the user 201 has selected to add a new door tip. Upon selection of one of the available backgrounds or icons for the new door tip, the mobile computing device 207 may prompt the user 201 to input text for the new tool tip. User interface 419 includes the prompt for the user 201 to input text for the new tool tip. The user 201 may input any desired text (e.g., "Go through this door" or "Leave this door shut") and accept the input. The text may be displayed within the new door tip, or as a pop-up that is displayed in association with the new door tip. Thereafter, the user 201 may be prompted to place the new door tip at a desired height. Upon the user 201 interacting with the user interfaces 415-421 to select the door and place the new door tip at the desired height, the mobile computing device 207 may store, as part of the data structure for the exit route, data indicating the door that includes an indication that the object type is a door; a location associated with the door (e.g., the last collected data point); and assistance information for the new door tip that indicates the selected background or icon, indicates the text input by the user 201, and indicates a display height for the door tip.

Identifying other objects, such as a stairwell or a sets of stairs, may be performed similarly to the way in which doors are identified. Accordingly, user interfaces similar to those of 411-421 could be generated to allow the user 201 identify other objects. Further, the other objects may be identified in ways different the manner in which doors are identified. For example, a set of stairs may be identified by a user pressing on a toggle button that causes the button to change states and indicate that the user 201 is traversing stairs. As the user 201 traverses the set of stairs and based on the state of the button, an object for the set of stairs may be identified and may be associated with each data point along the path. This process may continue until the user toggles the button a second time (thereby causing the button to change state again and indicate that the user 201 is not traversing stairs).

User interfaces 423-425 provide an example that allows the user 201 to add assistance information for the exit route. In particular, user interface 423 includes an area 423-1 that includes a number of preconfigured icons that can be placed along the exit route. Each of the preconfigured icons may include graphics or text to indicate information to a person traversing the exit route. For example, as shown in area 423-1, the preconfigured icons include an icon indicating "do not enter"; an icon indicating "exit through here"; an icon indicating phone numbers can be found posted here or nearby; an icon indicating a safe address can be found posted here or nearby; an icon indicating a ladder can be found here or nearby; an icon indicating pets are often found here or nearby; an icon indicating adults are found here or nearby; an icon indicating a baby or child is found here or nearby; an icon indicating a fire detector is found here or nearby; an icon indicating a fire extinguisher is found here or nearby; an icon indicating a flashlight is found here or nearby; and an icon indicating a disabled person is found here or nearby. The user interface 423 also includes a user selectable option to create a new tip, which may allow the user to input text for display along the exit route. The user 201 may select one of the preconfigured icons or may select the option to create the new tip. User interface 425 indicates that the user 201 has selected one of the preconfigured icons (e.g., the icon indicating "do not enter") and prompts the user to move the preconfigured icon to a display height. Upon the user 201 interacting with the user interfaces 423 and 425 to select the assistance information to place along the exit route and place the assistance information at the desired height, the mobile computing device 207 may store, as part of the data structure for the exit route, assistance information indicating the preconfigured icon that was selected or the text that was input, a location associated with the assistance information (e.g., the last collected data point), and a display height.

Figure 4F:
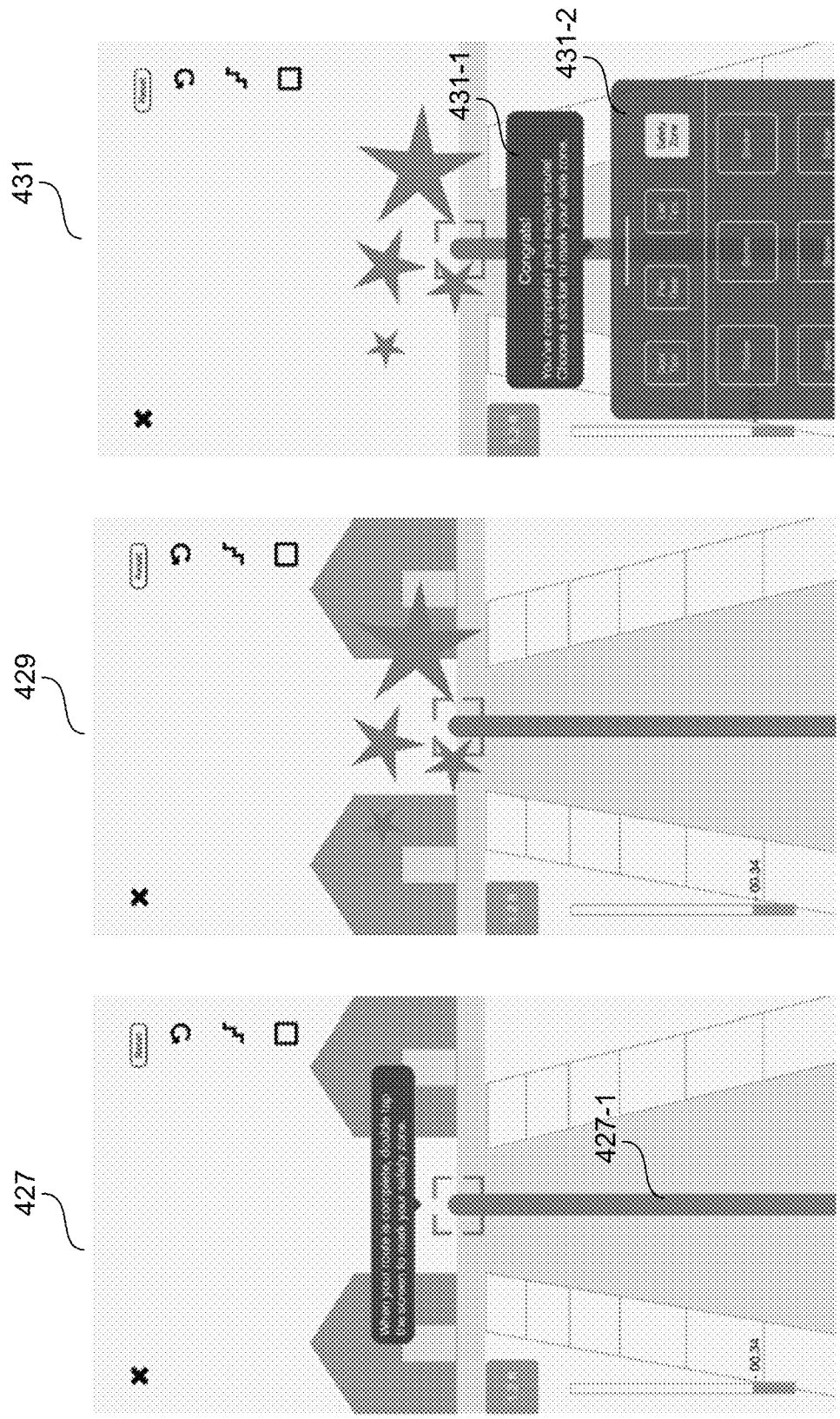

At 329, the user 201 may press on the user interface (e.g., on the target reticle of user interface 417) and, while continuing to press on the user interface, the user 201 may traverse a second portion of the path of the exit route. The second portion of the path of the exit route may include, for example, exiting the current room (e.g., a living room of the premises 203), moving through a hallway of the premises 203, and through an exterior door of the premises 203. At 330, the mobile computing device 207 may determine data points for the second portion of the path of the exit route, may store the data points in the data structure for the exit route, and may display a user interface indicating that data points are being collected. User interface 427 of FIG. 4F shows one example of a user interface that includes an indication that data points are being collected. As shown by the user interface 427, a path 427-1 indicates that data points are being collected. The user interface 427 may also indicate that the ground is present (e.g., by having the target reticle be a color, such as green or blue). The user interface 427 may also indicate a reminder that an end to the exit route can be identified based on a double tap of the user interface. This reminder may be displayed based on determining that the user 201 is traversing outside the premises 203.

At some point, the user 201 may desire to indicate that an end of the exit route has been reached (e.g., at location 205 of FIG. 2). Thus, at 333, the user 201 may cease pressing on the user interface and may stop traversing the path of the exit route. At 334, based on the cease in the pressing, the mobile computing device 207 may stop collecting data points.

At 337, the user 201 may perform a double tap on the user interface. The double tap may indicate an end of the exit route has been reached. At 338, the mobile computing device may, based on the indication that the end of the exit route has been reached, display an indication that the end of the exit route has been reached and may prompt the user 201 to identify a safe zone of the exit route. User interface 429 of FIG. 4F shows one example of a user interface that includes an indication that the end of the exit route has been reached (e.g., the graphics representing differently sized stars). User interface 431 of FIG. 4F shows one example of a user interface that includes a prompt to identify a safety zone (e.g., areas 431-1 and 431-2).

At 341, the user 201 may interact with the user interface to identify a safe zone of the exit route. At 342, the mobile computing device 207, based on the user interactions, may store, as part of the data structure, assistance information that indicates the safe zone of the exit route. Step 342 may be performed similar to step 326. For example, user interface 431 provides an example that allows the user 201 to add an indication of a safe zone. In particular, user interface 431 includes an area 431-2 that includes a user selectable option for the safe zone. Upon the user 201 selecting the option for the safe zone, the mobile computing device 207 may display a user interface prompting the user 201 to choose a display height for the safe zone. Upon selection of the display height, the mobile computing device 207 may store, as part of the data structure for the exit route, assistance information indicating the safe zone, a location associated with the safe zone (e.g., the last collected data point), and a display height.

Figure 3E:
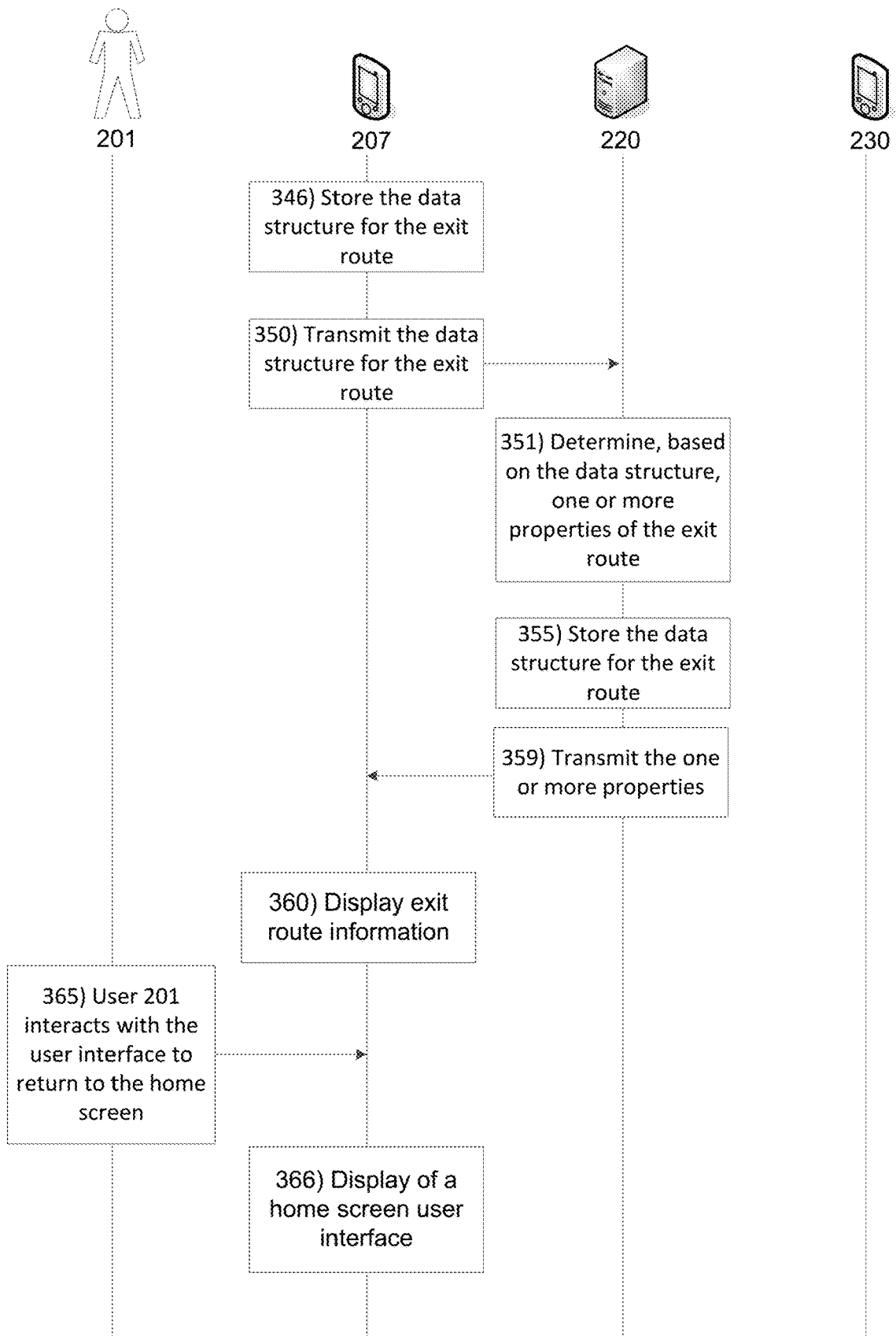

At 346 of FIG. 3E, based on the safe zone being identified, the mobile computing device 207 may store the data structure for the exit route. In this way, when the user 201 next views a home screen user interface, the exit route that was determined by this process may be listed. At 350, the mobile computing device 207 may transmit the data structure for the exit route to the server 220.

At 351, the server 220 may determine, based on the data structure, one or more properties of the exit route. For example, the server 220 may determine, based on the data structure, an estimated total distance for the exit route (e.g., the distance required to traverse from the beginning location of the exit route to an end location of the exit route). This determination may be based on the set of data points stored within the data structure. The server 220 may determine, based on the data structure, an estimated time to complete the exit route. For example, the estimated time to complete the exit route may be determined by multiplying the estimated total distance by an estimated time for a child or an adult to move a single unit of the distance. The server 220 may determine, based on the data structure, a count of tips or other information that is associated with the exit route (e.g., a count of the items in the set of the assistance information). The server 220 may store the one or more properties as part of the data structure for the exit route.

At 355, the server 220 may store the data structure for the exit route. The server 220 may also generate data associations for the data structure. For example, the server 220 may associate the data structure with a profile for the user 201. Based on the association with the profile for the user 201, the server 220 may be able to process the data structure based on the user 201 (e.g., when determining eligibility for a discount to a service or product). The server may associate the data structure with a profile for shared users. Based on the association with the profile for shared users, the server 220 may be able to process, track and otherwise manage which users have access to the data structure.

Figure 4G:
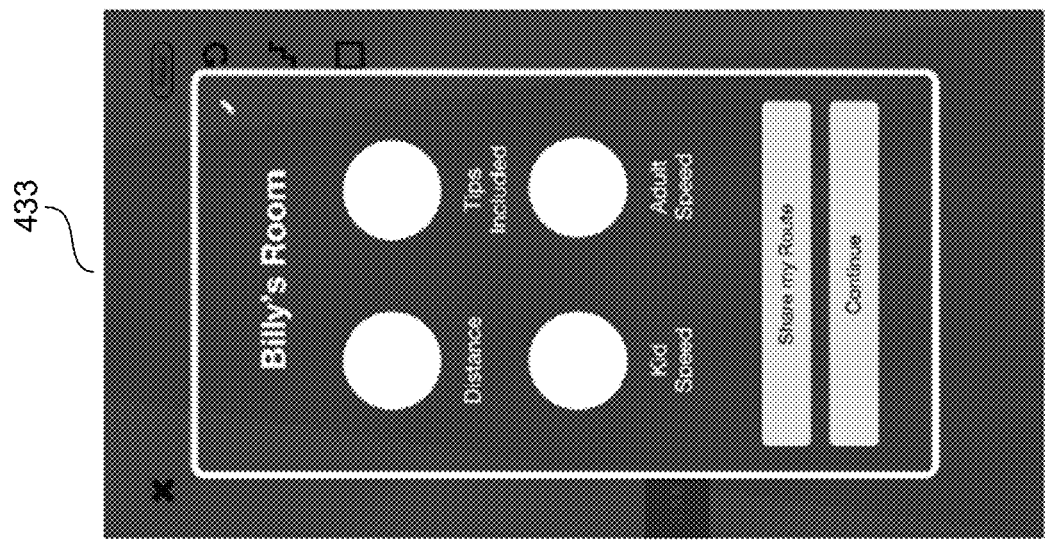
Figure 5A:
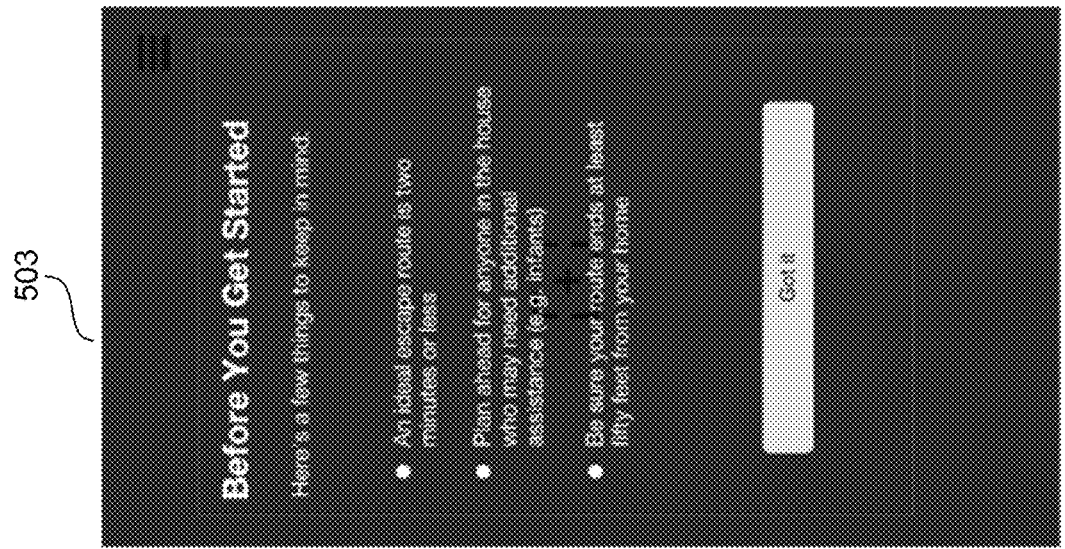
FIGS. 5A-5D show one or more example user interfaces that may be used in connection with a tutorial for an exit route.
Figure 5A:
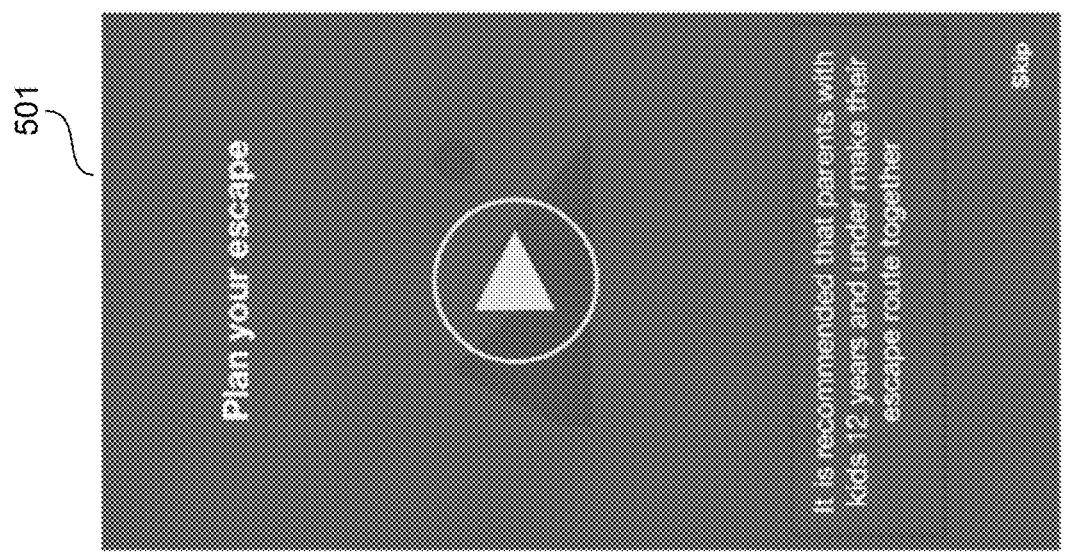
Figure 5B:
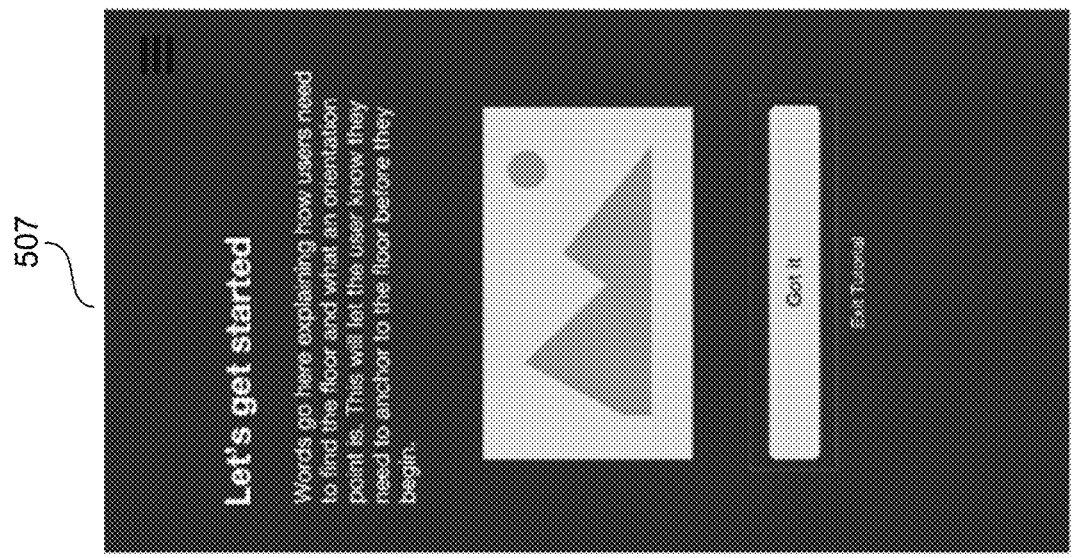
Figure 5B:
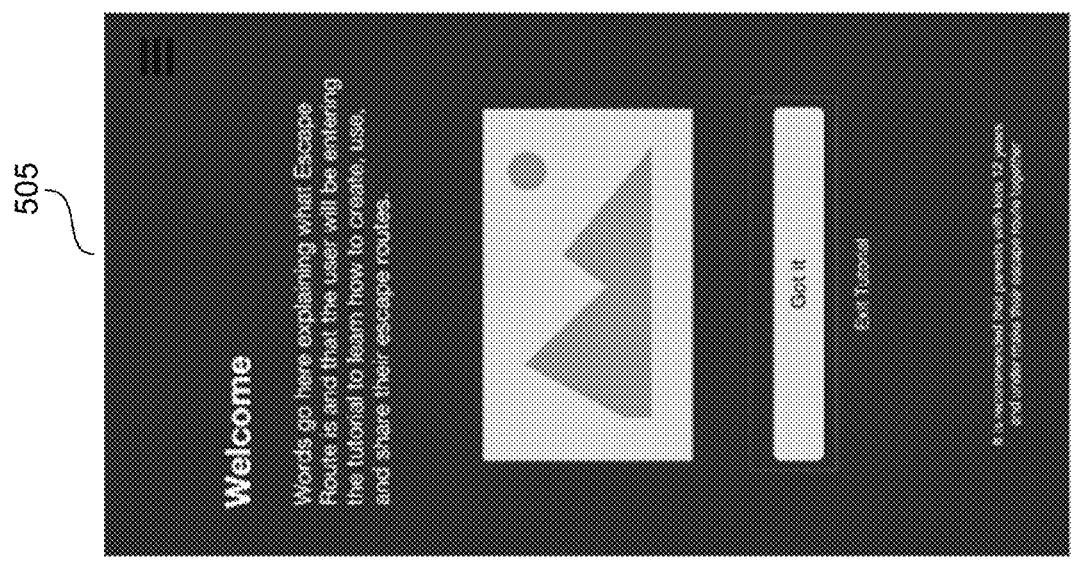
Figure 5C:
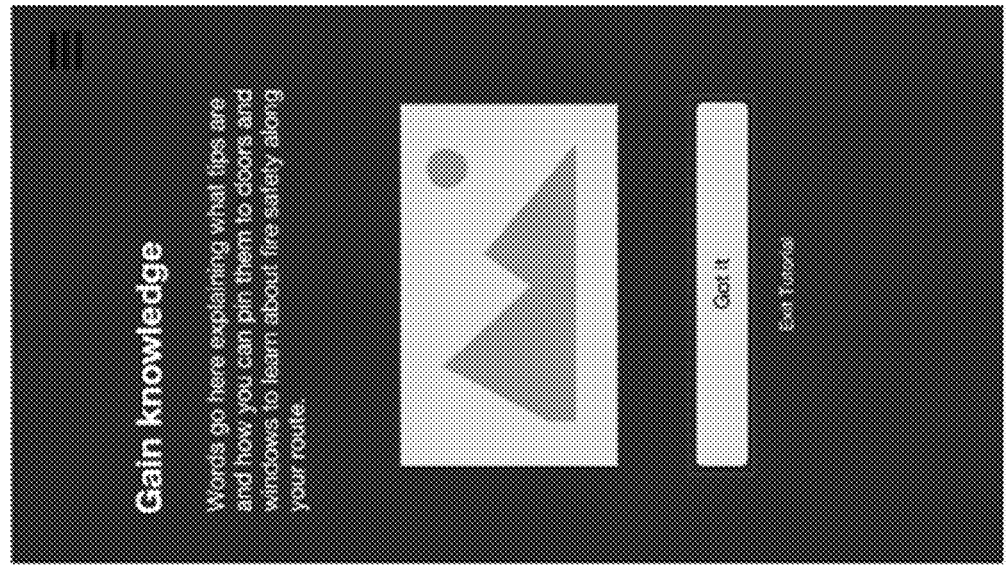
Figure 5C:
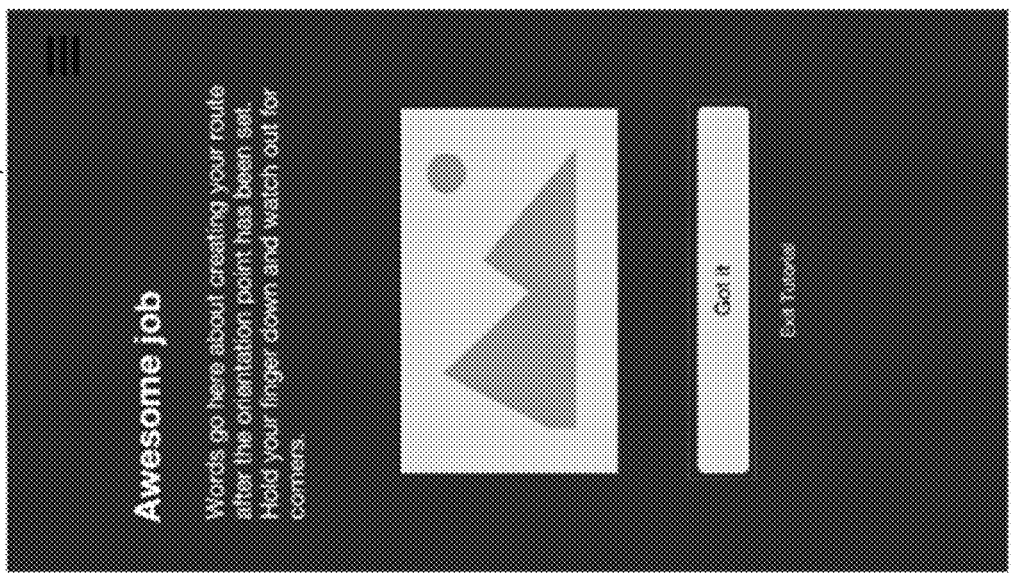
Figure 5D:
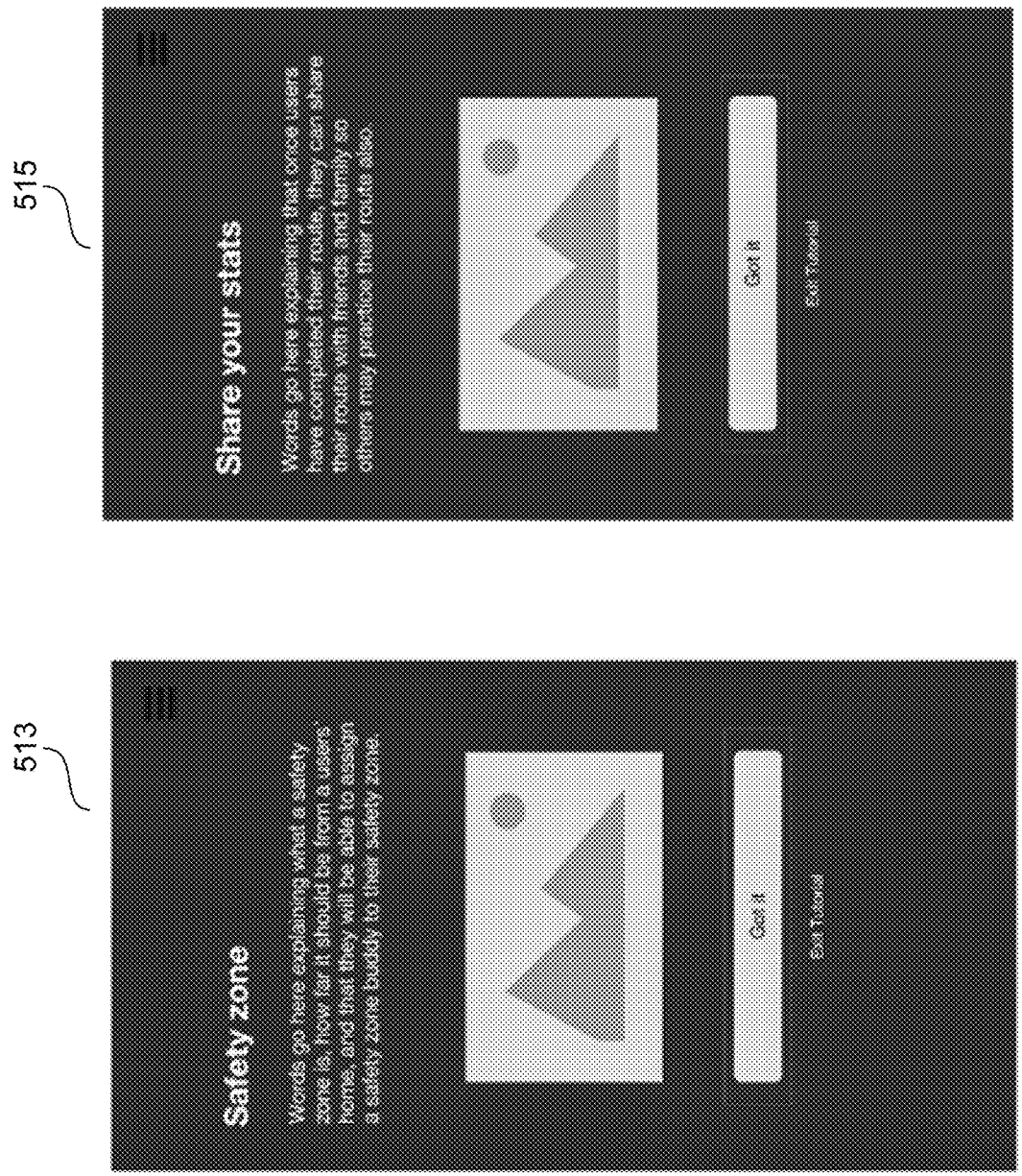

At 359, the server 220 may transmit the one or more properties to the mobile computing device 207. At 360, the mobile computing device 207 may display exit route information. The exit route information may provide a summary of the exit route and/or indicate the one or more properties of the exit route. The user interface 433 of FIG. 4G provides one example of a user interface that displays exit route information. As shown, the user interface 433 may include an indication of an estimated total distance for the exit route (e.g., 300 feet); an indication of a count of tips or other information that is associated with the exit route (e.g., 2 tips are displayed along the path of the exit route); an indication of a time to complete by a child (e.g., 100 seconds); and an indication of a time to complete by an adult (e.g., 90 seconds). Additionally, the mobile computing device 207 may store the one or more properties as part of the data structure.

While step 351 is shown in FIG. 3E as being performed at the server 220, step 351 may be performed by the mobile computing device 207 instead of the server 220. As an example, step 351 may be performed by the mobile computing device 207 after performing step 346, and step 350 may be performed after 351. Further, step 359 may not be performed if the mobile computing device 207 performs step 351 instead of the server 220. As an example, the mobile device 207 may, in connection with step 350, transmit the one or more properties that were determined by the mobile computing device 207; the server 220, at step 355, may store the one or more properties; and the server 220 may, instead of performing step 359, may transmit an acknowledgement of the exit route to the mobile computing device 207.

Returning to the depiction of FIG. 3E, at 365, the user 201 may interact with the user interface to return to a home screen user interface (e.g., by pressing the "Continue" button of user interface 433). At 366, the mobile computing device 207 may display a home screen user interface. The home screen user interface (e.g., user interface 401 of FIG. 4A) may include a listing for the newly determined exit route (e.g., "Billy's Room in area 401-2 of user interface 401).

It should be understood that the example described in connection with FIGS. 3A-3E and 4A-4G provides a simplified example of determining an exit route. For example, in the example, the user 201 traverses two portions of the exit route and, in between the first and second portions, identifies one or more objects along the path and/or adds assistance information for the exit route. In practice, the user 201 could traverse any number of portions of the exit route. In between each portion, the user 201 may or may not identify an object and may or may not add assistance information. In this way, other examples may change the order of any of the steps discussed in connection with the example of FIGS. 3A-3E and 4A-4G. For example, steps 325 and 326 may be performed before steps 317 and 318 such that the user 201 identifies an object or adds assistance information prior to traversing the first portion of the exit route. Further, additional steps may be added. For example, steps 325-330 may be repeated after the user traverses a second portion of the exit route so that the user 201 may identify an object or add assistance information prior to traversing a third portion of the exit route. Some steps may be omitted. For example, steps 325 and 326 may be omitted if the user 201 simply traverses the exit route and never identifies an object or adds assistance information. Some steps may be performed by different devices. For example, instead of step 351 being performed by the server 220, step 351 may be performed by the mobile computing device 207 (e.g., prior to step 350), and step 359 may not be performed due to step 351 being performed by the mobile computing device 207.

As indicated by the home screen user interfaces 400 and 401 of FIG. 4A, the user 201 may be able to enter a tutorial for an exit route (e.g., by selecting "Escape Tutorial" within area 400-1 of user interface 400). The tutorial may be a preconfigured set of user interfaces that provide helpful information to the user 201. The user may proceed through the tutorial at their own pace (e.g., by selecting continue when ready to proceed to the next user interface in the tutorial). Alternatively, the user interfaces may be interspersed as the user 201 determines an exit route. For example, the user interfaces for the tutorial may be displayed as various points within the example of FIGS. 3A-3E.

FIGS. 5A-5D show one or more example user interfaces that may be used in connection with a tutorial for an exit route. User interface 501 of FIG. 5A may provide information indicating what an exit route usually entails, why exit routes are useful, and a recommendation for parents to determine exit routes with children below a certain age. User interface 503 may provide criteria for an exit route including, for example, an indication that an exit route should be completed in less than a certain amount of time (e.g., 2 minutes); an indication to plan for persons within the house, such as smaller children or disabled persons that will take longer to exit the premises 203; and an indication that a safe zone should be a minimum (e.g., 50 feet) distance away from the premises 203. User interface 505 of FIG. 5B may provide information indicating the process the user 201 will perform with the mobile computing device 207 to determine the exit route (e.g., capture an image of a beginning location; traverse a path of the exit route while the camera points at the floor or the ground; identify objects along a path; add information for display along the path; and identify a safe zone of the exit route). The user interface 507 may provide information indicating how the user 201 is to point the camera at the floor or the ground, how the user interface indicates the floor or the ground has been, and the like. The user interface 509 of FIG. 5C may provide information indicating how the user 201 is to traverse the path of the exit route (e.g., by continually pressing on a target reticle displayed on the mobile computing device 207). The user interface 511 may provide information indicating why identifying objects and/or adding assistance information may be useful for an exit route. The user interface 511 may also provide information indicating how objects identified, how assistance information is added, and how objects and assistance information are displayed. The user interface 513 of FIG. 5D may provide information indicating what a safe zone is, how far it should be from a premises 203, and the like. The user interface 515 may provide information indicating how users can share exit routes with other users and/or traverse exit routes as a way to practice exiting the premises 203. The user interfaces of FIGS. 5A-5D are only some examples of the types of user interfaces that may be used as a tutorial for an exit route.

Figure 6A:
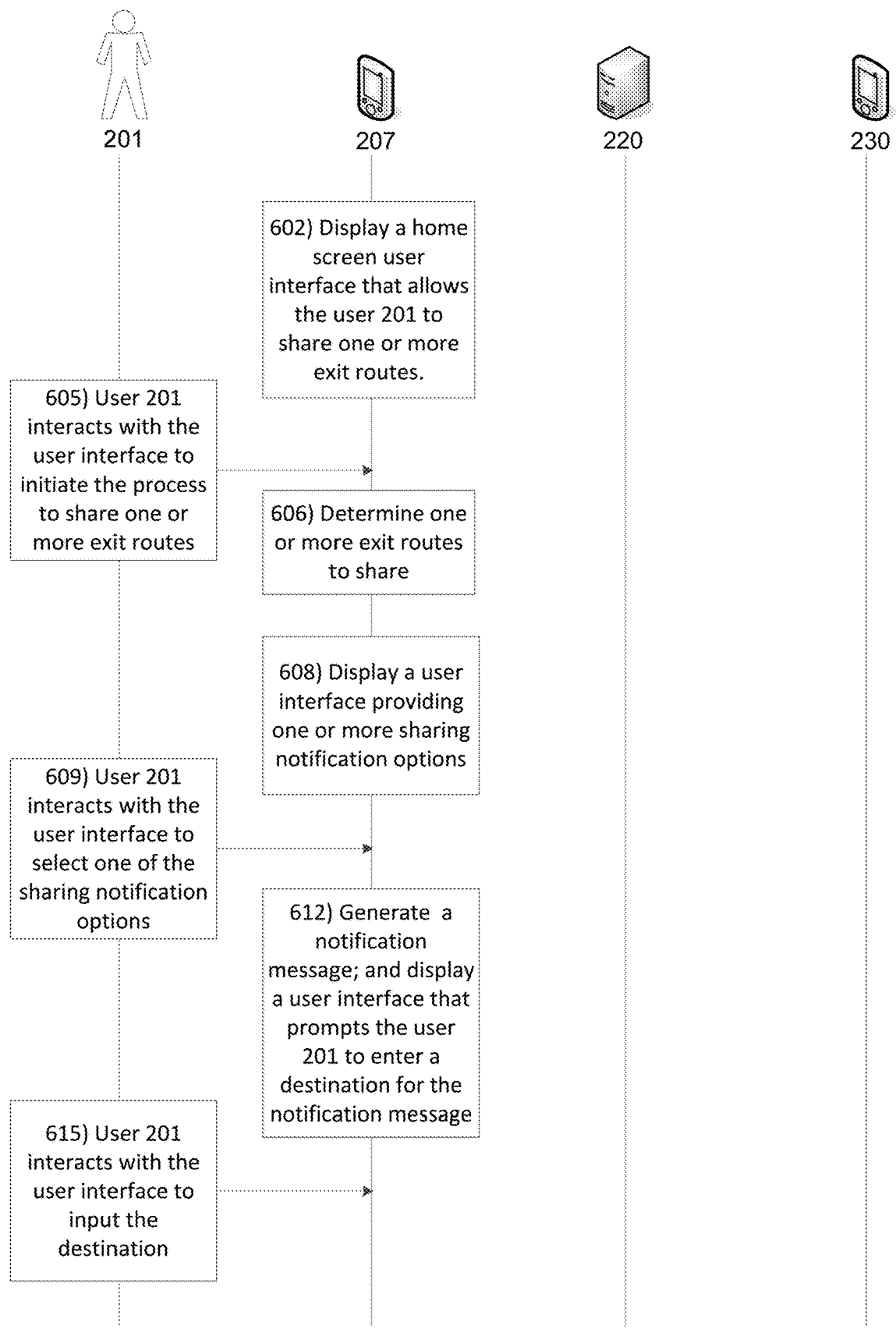
FIGS. 6A-6B show one or more example method flows that include sharing an exit route.
Figure 6B:
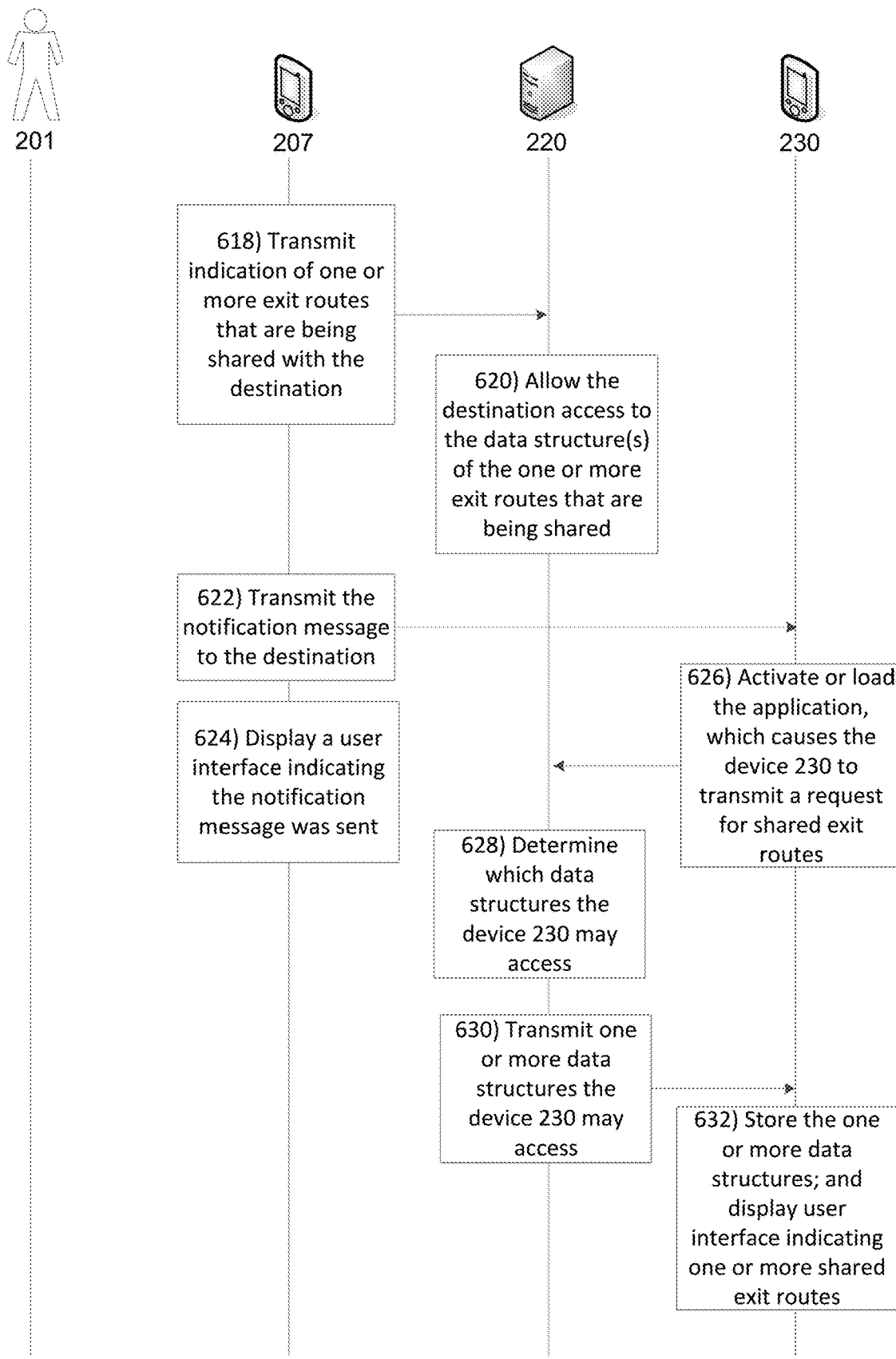
Figure 7A:
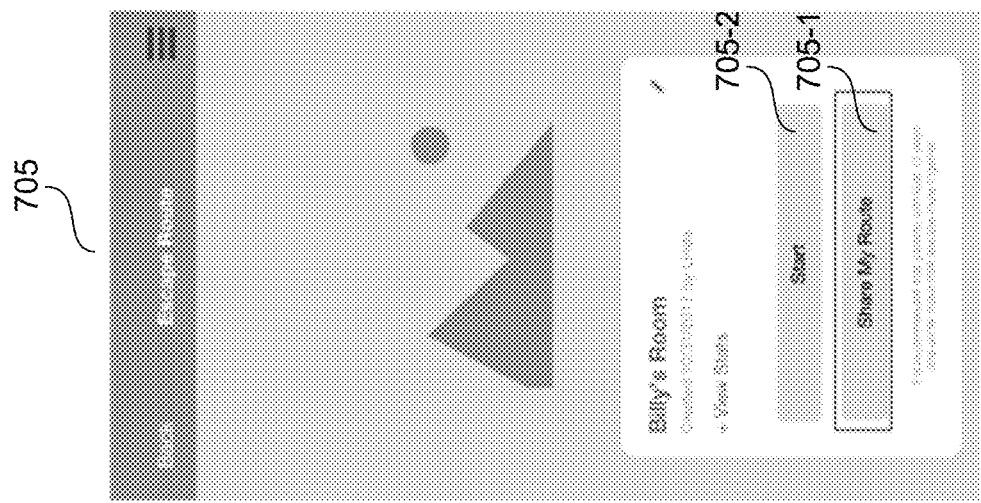
FIGS. 7A-7C show one or more example user interfaces that may be used in connection with a process for sharing an exit route.
Figure 7A:
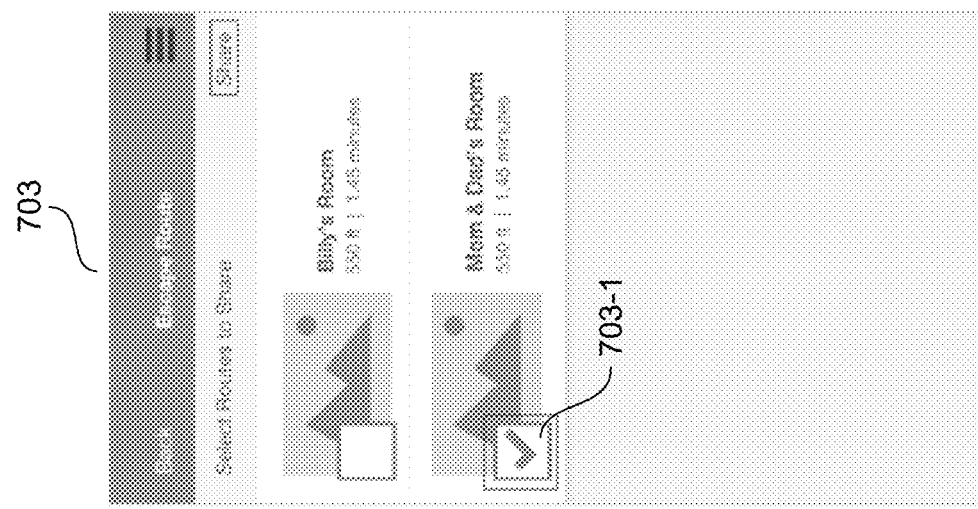
Figure 7A:
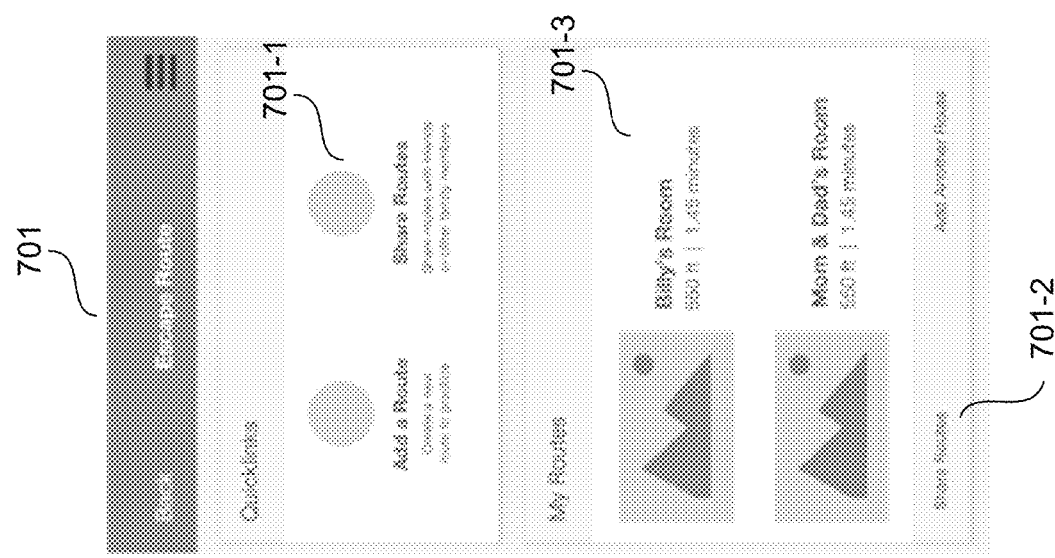
Figure 7B:
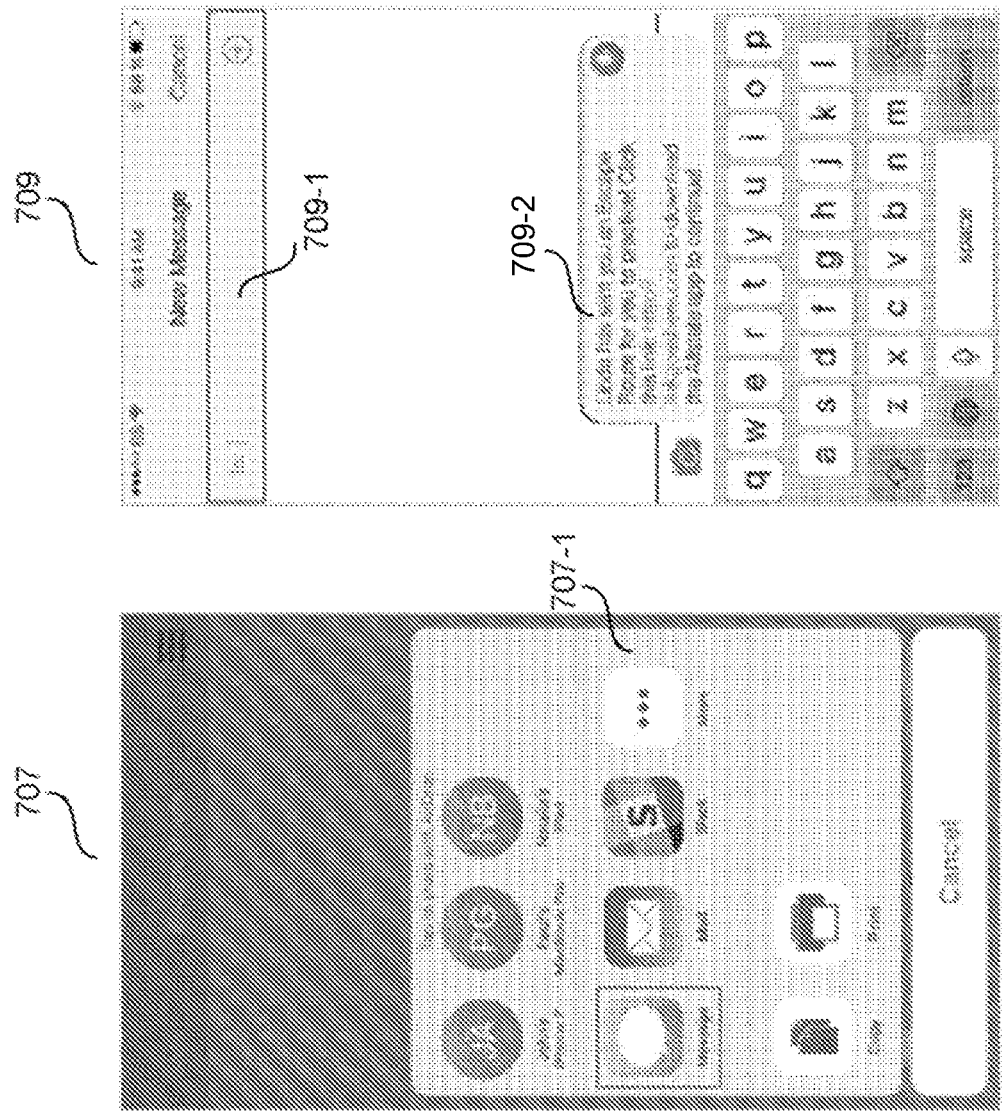
Figure 7C:
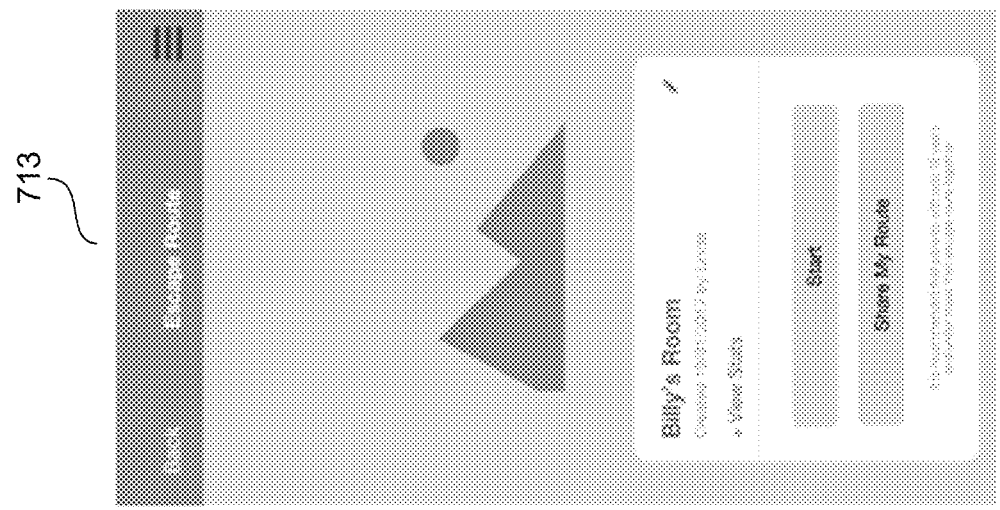
Figure 7C:
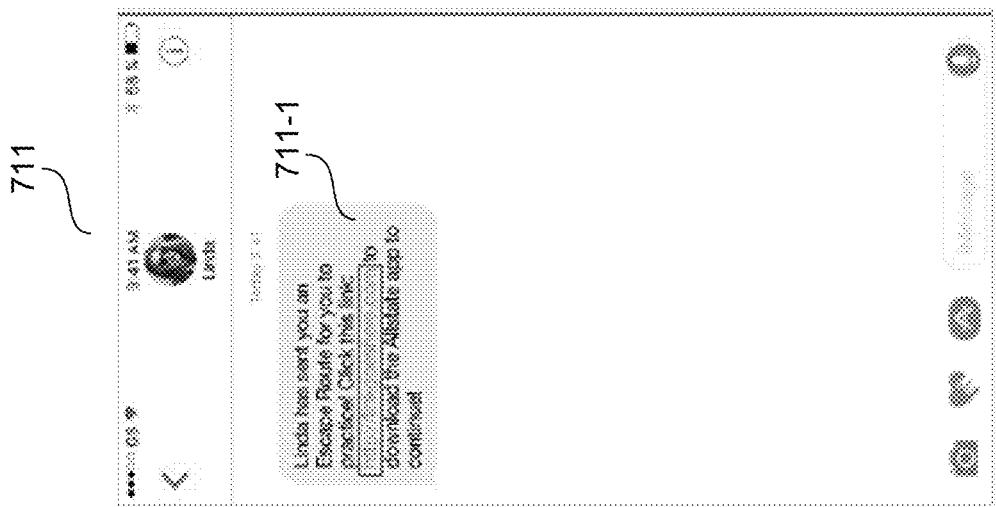
Figure 8A:
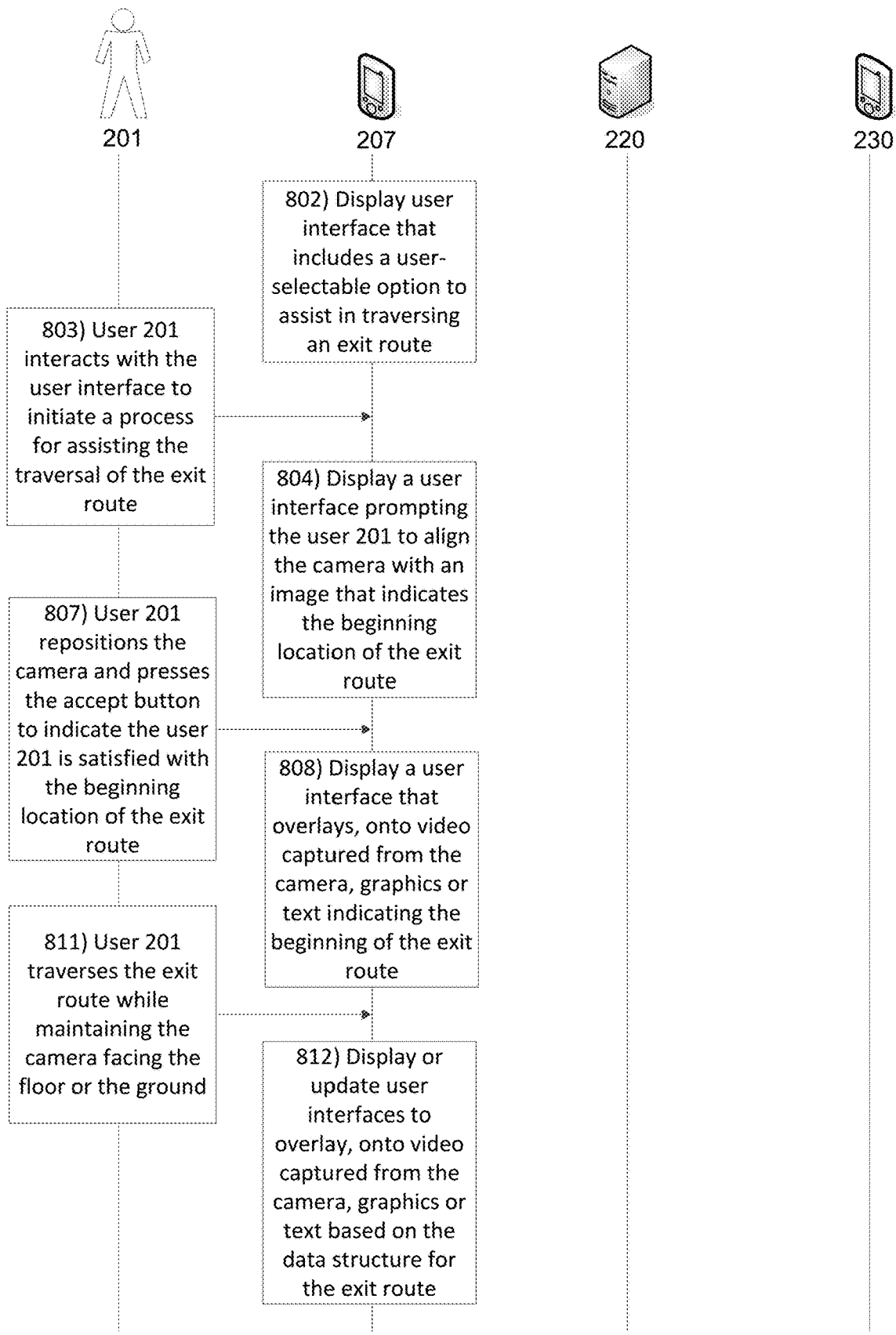
FIGS. 8A-8B show one or more example method flows that include assisting a user with traversing an exit route.
Figure 8B:
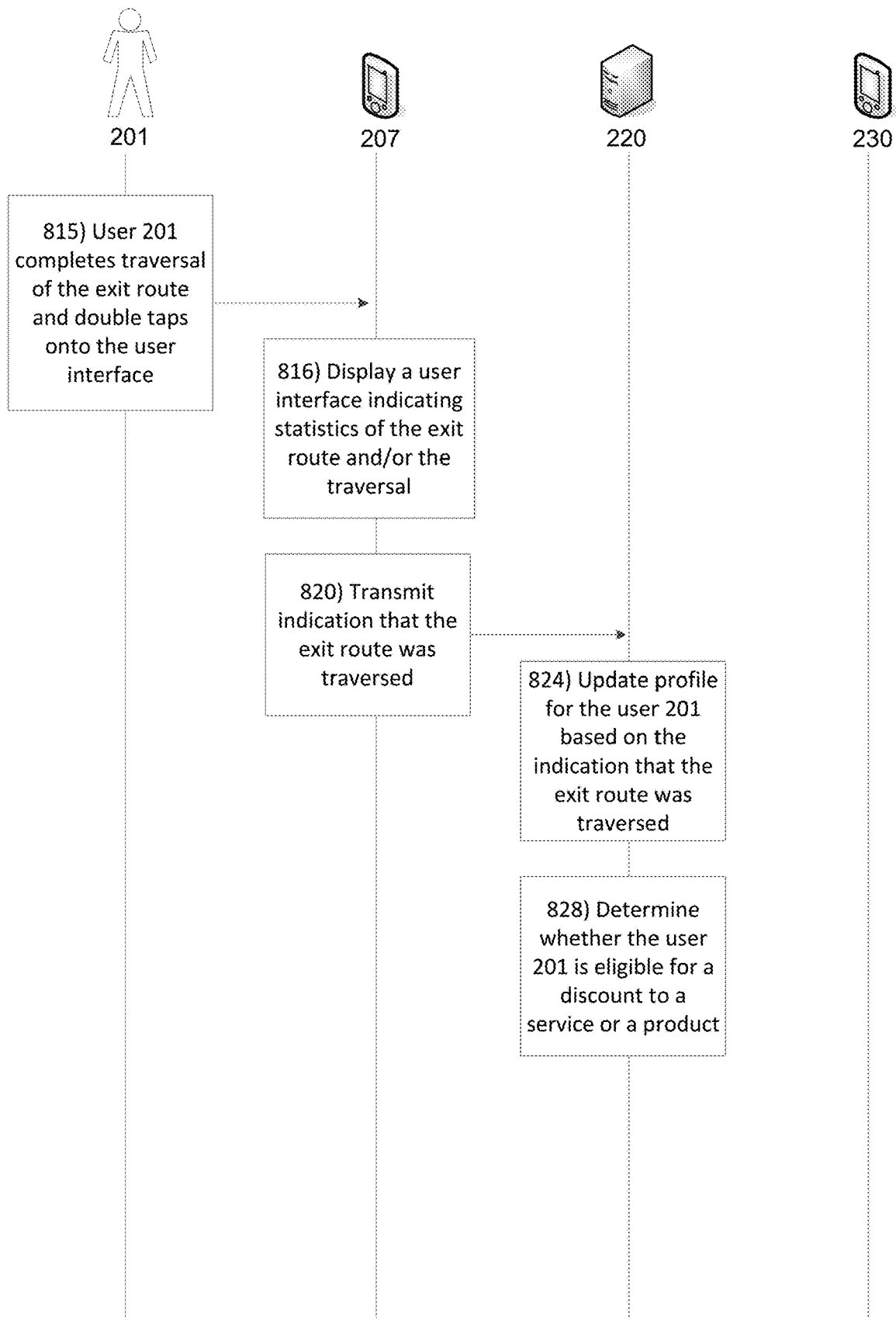

As discussed above, a user may be able to share an exit route. To provide one or more examples of how an exit route may be shared, an example method flow, as shown at FIGS. 6A-6B, will be discussed in view of a number of example user interfaces, as shown at FIGS. 7A-7C. The example, in particular, is directed at a user 201 using the mobile computing device 207 to share an exit route with a device 230.

At 602, the mobile computing device 207 may display a home screen user interface, which may allow the user 201 to share one or more exit routes. User interface 701 of FIG. 7A provides one example of a home screen user interface. As shown, user interface 701 includes a number of options for sharing an exit route. Selectable sharing options 701-1 and 701-2 may allow for a user to share exit routes in batches. Sharing in batches may allow for the user 201 to select any number of exit routes for sharing using a single user interface. User interface 703 provides one example of a user interface that allows a user 201 to share exit routes in batches. The user 201 may also be able to select a particular exit route to view additional information about an exit route. For example, the user 201 may press on area 701-3 to bring up additional information for the exit route that has the name "Billy's Room". The additional information may include an option to share the exit route. User interface 705 provides one example of a user interface that allows a user 201 to share a particular exit route.

At 605, the user 201 may interact with the user interface to initiate a process to share one or more exit routes. For example, the user 201 may select an option to initiate a process that shares one or more exit routes in batches (e.g., by pressing 701-1 or 701-2 of user interface 701). As another example, the user may select an option to share a particular exit route (e.g., by pressing on area 705-1 of user interface 705).

At 606, the mobile computing device 207 may determine of one or more exit routes to share. For example, if the user 201 selected an option to initiate a process that shares one or more exit routes in batches, the mobile computing device 207 may prompt the user 201 to select which exit routes to share. User interface 703 is one example of a user interface that prompts the user to select which exit routes to share. User interface 703 provides a listing of exit routes and the user 201 is able to select or deselect each exit route at their option. Any exit route that is selected (e.g., via the check indication at area 703-1) may be shared by the mobile computing device. As a particular example, the mobile computing device 207 may determine to share the exit route named "Mom & Dad's Room" based on the user 201's selections indicated by user interface 703. As another example, if the user 201 selected an option to share a particular exit route, the mobile computing device 207 may share the exit route that is associated with the selected option. As a particular example, mobile computing device 207 may determine that the exit route named "Billy's Room" will be shared based on the user 201's press on area 705-1 of user interface 705.

At 608, the mobile computing device 207 may display a user interface providing one or more sharing notification options. The sharing options may include various mechanisms for notifying another device or user of the shared exit route(s). User interface 707 of FIG. 7B provides one example of a user interface that provides one or more sharing notification options. As shown, user interface 707 includes an area 707-1 that allows for the user 201 to notify via text message, email, slack, or other messaging mechanism.

At 609, the user 201 may interact with the user interface to select one of the sharing notification options. For example, the user 201 may select text messaging (e.g. the leftmost icon of area 707-1 of user interface 707) as the mechanism to notify another device or user of the shared exit route(s).

At 612, the mobile computing device 207 may generate a notification message and may display a user interface that prompts a user to enter a destination for the notification message. The mobile computing device 207 may generate the notification message based on the selected notification option (e.g., generate an email message if a notification option for email is selected, generate a text message if a notification option for text messaging is selected, etc.) Generating the notification message may include interfacing with an operating system of the mobile computing device 207, or another application of the mobile computing device 207 to generate the notification message. The mobile computing device 207 may generate text for the notification message. For example, the text for a notification message may include a name or other identifier of the user 201. The text may also provide a link, such as a link to an application store that will allow the download of the application that enables access to the exit route. After generating the text, the mobile computing device 207 may cause the text to be prepopulated into the notification message. The user interface 709 is one example of a user interface that includes a notification message and prompts the user 201 to enter a destination for the notification message. As shown, the user 201, via area 709-1, is able to type a destination (e.g., a phone number, email address, contact list entry from a contact list of the mobile computing device 207, etc.) for the notification message. The notification message is shown at area 709-2 of the user interface 709 and is shown as included prepopulated text. The prepopulated text at area 709-2 is one example of text that can be generated for a notification message.

At 615, the user 201 may interact with the user interface to input the destination. For example, the user 201 may, at area 709-1 of the user interface 709, input a phone number for the device 230; an email address associated with a user of the device 230; a contact list entry, from a contact list of the mobile computing device 207, for a user of the device 230; or the like.

At 618, the mobile computing device 207 may transmit, to the server 220, an indication of one or more exit routes that are being shared with the destination. For example, the mobile computing device 207 may transmit the data structure for each exit route that is being shared (or some other identifier for each exit route being shared) and may transmit an indication of the destination that the user 201 input at 615 (e.g., the phone number for the device 230; the email address associated with a user of the device 230; or the contact list entry, from a contact list of the mobile computing device 207, for a user of the device 230).

At 620, the server 220 may allow the destination access to the data structure(s) of the one or more exit routes that are being shared by the user 201. For example, the server 220 may locate the profile for shared users that is associated with a data structure being shared, and may update the profile to indicate the destination as one of the users that has access to the data structure. The server 220 may repeat that process for each of the exit routes being shared by the user 201.

At 622, the mobile computing device 207 may transmit the notification message to the destination. For this example, and as illustrated at 622 of FIG. 6B, the destination is device 230.

At 624, the mobile computing device 207 may display a user interface indicating the notification message was sent. The user interface 711 of FIG. 7C is one example of a user interface that indicates the notification was sent. As shown, the user interface 711 indicates, at area 711-1, that the notification message was sent via text message. The text message was sent to "Linda", who is a user of device 230.

At some other point in the future, a user of the device 230 may wish to access the exit route that was shared. Steps 626-632 of FIG. 6B provide one example where a user of device 230 accesses a shared exit route. These, or similar, steps may also be performed based on the mobile computing device 207 accessing one or more exit routes that were shared with the mobile computing device 207 or the user 201.

At 626, the device 230 may activate or load the application that enables access to the exit route. The application may generate user interfaces that enable a user of the device 230 to, among other things, access previously-determined exit routes, to access previously-shared exit routes, and to determine a new exit route. Activation or loading of the application may cause the device 230 to transmit a request for shared exit routes to the server 220. The request may include identifying information for the device 230 (e.g., a phone number of the device 230) or a user of the device 230 (e.g., an email address of the user)

At 628, the server 220 may determine which data structures the device 230 may access. In other words, the server 220 may determine which exit routes have been shared with the device 230 or with the user of the device 230. The server 220 may perform this determination by searching the profiles for shared users based on the identifying information from the request. For example, the server 220 may determine that the device 230 has access to a particular data structure for an exit route if the profile for shared users that is associated with the particular data structure includes a phone number or email address that matches the identifying information for the device 230.

At 630, the server 220 may transmit, to the device 230, one or more data structures the device 230 may access. For example, if at 628, the server 220 determined that the device had access to a data structure for an exit route named "Billy's Room", that data structure may be transmitted to the device 230.

At 632, the device 230 may receive and store the one or more data structures that were transmitted by the server 220 at 630. Further, the device 230 may display a user interface indicating access to the one or more data structures. The user interface 713 provides one example user interface that indicates one or more shared exit routes. In particular, the user interface 713 indicates that a data structure for an exit route named "Billy's Room" is accessible to the device 230. As another example, device 230 may display user interface 401 of FIG. 4A. The entry for the exit route named "Billy's Room" may be presented based on the mobile device 207 sharing that exit route with the device 230. The entry for the exit route named "Mom & Dad's Room" may be presented based on the device 230 determining the exit route itself (e.g., using a method flow similar to the example provided at FIG. 3A-3E). Thereafter, the user of the device 230 may perform various actions on the data structure(s) that were shared including, for example, editing the data structure, deleting the data structure, and/or assisting the user in traversing the exit route by using the data structure as a basis for augmenting a real-time video display.

It should be understood that the example described in connection with FIGS. 6A-6B and 7A-7C provides a simplified example of sharing an exit route. For example, other examples may change the order of any of the steps discussed in connection with the example of FIGS. 6A-6B and 7A-7C. For example, steps 618 and 622 may be reversed in order. Further, additional steps may be added. For example, the mobile computing device 207 may perform steps similar to steps 626-632 to receive, store and access any data structures that have been shared with the mobile computing device 207 or the user 201. Some steps may be omitted. For example, step 632 may be omitted if the device 230 is configured to request, receive and store data structures of shared exit routes on a periodic basis. Some steps may be performed by different devices.

As discussed throughout this disclosure, a data structure for an exit route may be used as a basis for assisting a user with traversing the exit route. The assistance may be provided based on an augmented real-time video display. An example of augmenting a real-time video display is provided by the combination of the example method flow of FIGS. 8A-8B and the example user interfaces of FIGS. 9A-9B. The example, in particular, is directed at a user 201 using the mobile computing device 207 to assist in traversing an exit route. As the user 201 traverses the exit route, the mobile computing device 207 may, based on the data structure for the exit route, overlay graphical or textual information over image or video data captured by the mobile computing device 207's camera. The graphical or textual information may indicate, among other things, a path of the exit route, the presence of doors or stairs, or a safe zone of the exit route.

Figure 9A:
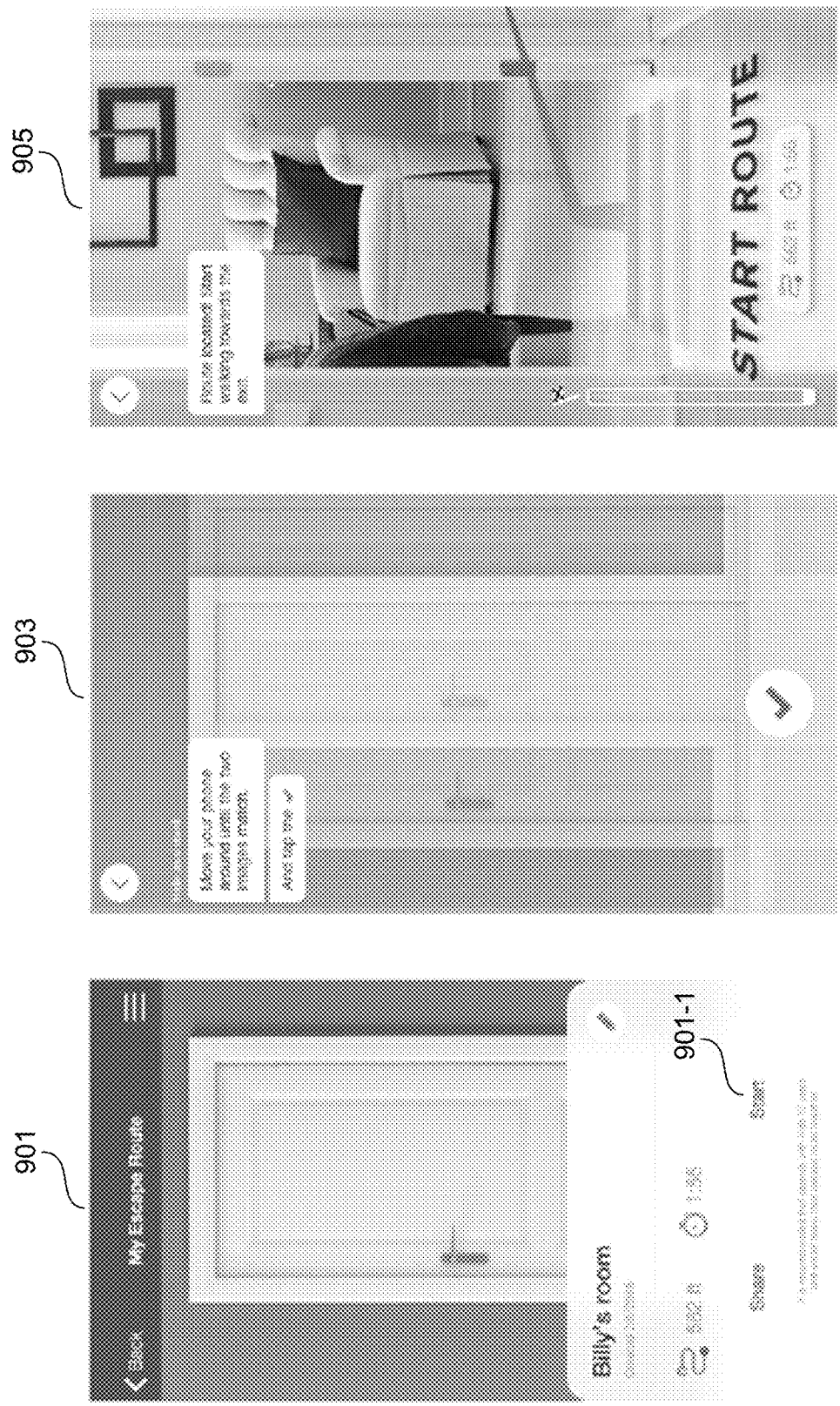
FIGS. 9A-9B show one or more example user interfaces that may be used in connection with a process for assisting the traversal of an exit route.
Figure 9B:
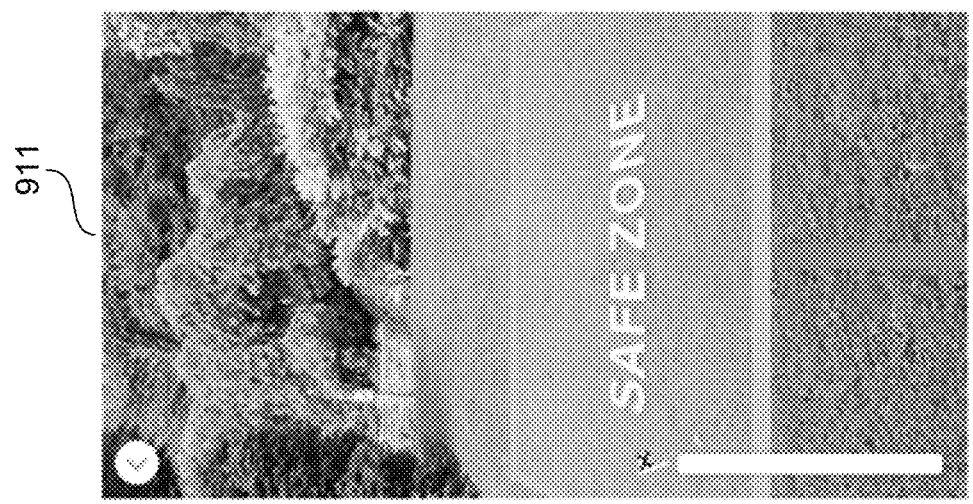
Figure 9B:
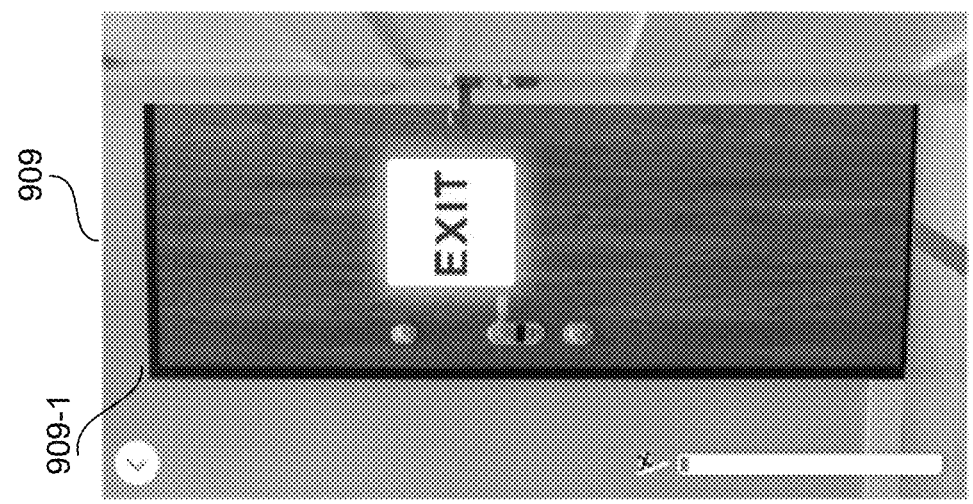
Figure 9B:
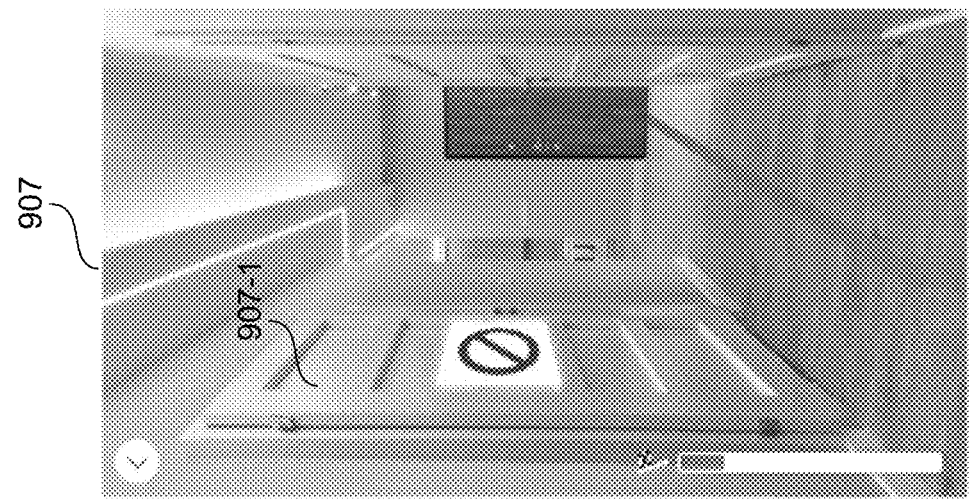

At 802, the mobile computing device 207 may display a user interface that includes a user-selectable option to assist in traversing an exit route. The user interface 901 of FIG. 9A is one example that includes, at area 901-1, a user-selectable option to assist in traversing an exit route. In particular, the user interface 901 provides an option to traverse the exit route named "Billy's Room". The user interface 901 also includes the image indicating the beginning location of the exit route. The user interface also includes properties of the exit route, such as the estimated total distance of the exit route (e.g., 562 feet) and an estimated time to complete the exit route (e.g., 1 minute and 55 seconds). The image and the properties of the exit route may be retrieved from the data structure for the exit route. The user interface 901 may be displayed based on the user 201 selecting, via the user interface 401 of FIG. 4A, the exit route named "Billy's Room". The user interface 705 of FIG. 7A is another example that includes, at area 705-2, a user-selectable option to assist in traversing an exit route. The user interface 705 may be displayed based on the user 201 selecting, via the user interface 701, the area 701-3 for the exit route named "Billy's Room".

At 803, the user 201 may interact with the user interface to initiate a process for assisting the traversal of the exit route. For example, the user may press area 901-1 of the user interface 901. At 804, the mobile computing device 207 may display a user interface prompting the user 201 to align the camera of the mobile computing device 207 with the image that indicates the beginning location of the exit route. User interface 903 of FIG. 9A is one example that includes a prompt for the user 201 to align the camera of the mobile computing device 207 with the image that indicates the beginning location of the exit route. As shown, the user interface 903 includes information indicating that the user 201 is to match an image of a door frame and, once the user 201 is satisfied with the match, the user 201 is to press an accept button (e.g., the check button of the user interface 903).

At 807, the user 201 repositions the camera and presses the accept button. Pressing the accept button may indicate that the user 201 is satisfied with the beginning location of the exit route. At 808, the mobile computing device may display a user interface that overlays, onto video captured from the camera, graphics or text indicating the beginning of the exit route. The video captured from the camera may be real-time video. In this way, the mobile device may be overlaying the graphics and text over the exit route as the user 201 traverses the exit route. The user interface 905 of FIG. 9A provides on example of a user interface that overlays, onto video captured from the camera, graphics or text indicating the beginning of the exit route. As shown the user interface 905 may include text indicating the beginning of the exit route (e.g., "START ROUTE"), and an indication of a direction of a path of the exit route (e.g., the graphical path that angles towards the right edge of the display). The direction of the path may be determined based on the set of data points stored by the data structure for the exit route. For example, if the data points are a set of 3D data points, the mobile computing device 207 may determine a 3D directional vector that points to a data point that is a threshold distance away from the current location (e.g., 15 feet along the path from the current location). Graphics for the direction of the path may be overlaid to indicate the 3D directional vector. Once a particular graphic or text is determined to be overlaid, the mobile computing device 207 may provide the particular graphic or text to ARKit for rendering.

At 811, the user 201 may traverse the exit route while maintaining the camera facing the floor or the ground. At 812, the mobile computing device 207 may, as the user 201 is traversing in accordance with 811, display or update one or more user interfaces that overlay, onto video captured from the camera, graphics or text. The overlaid graphics or text may be determined based on the data structure for the exit route. For example, based on the data structure, assistance information may be displayed as pop-up graphics or text along the route. Based on the data structure, graphics or text identifying one or more objects along the path may be displayed. User interfaces 907, 909 and 911 provide a few examples of user interfaces that overlay, onto a real-time view received via the camera, graphics or text. In general, the data stored by the data structure—including the set of data points, the data indicating one or more objects that occur along the path of the exit route, and the set of assistance information indicating information to display along the path of the exit route—may be used as a basis for overlaying graphics or text onto the video display.

As shown, the user interface 907 includes a graphical icon (e.g., the icon that indicates "no not enter") associated with a door 907-1. The user interface 907 also includes an indication of a direction of a path of the exit route (e.g., the graphical path that angles towards the far door). The user interface 909 includes a graphical icon (e.g., an icon that indicates "exit through here") associated with a door 909-1. The user interface 909 also includes an indication of a direction of a path of the exit route (e.g., the graphical path that angles towards and under the door 909-1). The user interface 911 includes graphics indicating a safe zone for the exit route. The user interface 911 also includes an indication of a direction of a path of the exit route (e.g., the graphical path that extends from the bottom of the display and ends at the graphic for the safe zone). Additionally, each of the user interfaces 907, 909 and 911 include a progress bar that indicates the user 201's progress towards the safe zone. The mobile computing device 207 may determine the progress based on the data points of the data structure.

The mobile computing device 207 may continue overlaying graphics and text onto the video display until a time at which the user 201 completes the traversal of the exit route. At 815, the user 201 may have completed the traversal (e.g., by reaching the safe zone of the exit route) and may double tap one the user interface (e.g., by double tapping onto the graphic for the safe zone as shown by user interface 911 of FIG. 9B). The double tap may indicate that the user 201 has completed traversing the exit route.

At 816, based on the indication that the user 201 has completed traversing the exit route, the mobile computing device 207 may display a user interface indicating statistics of the exit route and/or statistics of the traversal. For example, the user interface may indicate the one or more properties from the data structure and also may indicate one or more statistics associated with the user 201's performance in traversing the exit route (e.g., a total time to complete the traversal).

At 820, the mobile computing device 207 may transmit, to the server 220, an indication that the exit route was traversed. For example, the mobile computing device 207 may transmit the data structure for the exit route that was traversed (or some other identifier for the exit route that was traversed), data flag indicating the traversal was completed, and one or more statistics associated with the user 201's performance in traversing the exit route (e.g., a total time to complete the traversal)

At 824, the server 220 may, based on the indication that the exit route was traversed, update a profile for the user 201. For example, the profile for the user 201 may be updated to indicate which exit route was traversed, how long it took to complete, and the date on which the exit route was traversed.

At 828, the server may determine whether the user 201 is eligible for a discount to a service or a product. As an example, the discount may be to reduce the price of fire safety equipment, such as a smoke detector. The discount may be to reduce the premium of an insurance policy. There are many conditions that may be placed on the user 201's eligibility for the discount. As some examples, the server 220 may determine that the user 201 is eligible for a discount based on upon the user 201 completing the traversal of the exit route. The server 220 may determine that the user 201 is eligible for a discount based on the user 201 completing the traversal within a targeted time (e.g., within 2 minutes from beginning the traversal). The server 220 may determine that the user 201 is eligible for a discount based on the user 201 having completed the traversal of the exit route within a threshold number of days or months (e.g., the user 201 may be eligible for the discount if the user 201 completes the traversal of the exit route once a year). The server 220 may determine that the user 201 is eligible for a discount based on the user 201 practicing the exit route in accordance with a periodic schedule (e.g., the user 201 may be eligible for the discount if the user 201 traverses the exit route to completion at least every sixth months or at least twice a year). The server 220 may determine that the user 201 is eligible for a discount based on the user 201 having established exit routes for members of his or her family (e.g., the user 201 may be eligible for the discount if exit routes have been established for a spouse and one or more children). The eligibility for the discount may be based on additional conditions applied the members of user 201's family including, any of the above-mentioned conditions discussed above in connection with user 201 (e.g., the user 201 may be eligible for the discount if the spouse and the one or more children have practiced the exit route in accordance with a periodic schedule; and/or the user 201 may be eligible for the discount if the spouse and the one or more children have completed the traversal of the exit route within a targeted time, which may be specific to each family member). The above-mentioned conditions may be combined with each other and/or with additional conditions when determining eligibility for the discount.

If the user 201 is eligible for a discount, the server 220 may transmit message to a billing server (not shown) that causes, for example, the discount to be applied to the insurance policy of the user 201 and/or the discount to be applied to a transaction for purchasing fire safety equipment. Applying the discount may take the form of a credit to an account associated with the user 201. In this way, the credit can be used at a later time by the user 201 when, for example, purchasing a desired item of fire safety equipment.

It should be understood that the example described in connection with FIGS. 8A-8B and 9A-9B provides a simplified example of assisting the traversal of an exit route by overlaying graphics and text onto a video display. For example, other examples may change the order of any of the steps discussed in connection with the example of FIGS. 8A-8B and 9A-9B. For example, steps 824 and 828 may be reversed in order. Further, additional steps may be added, omitted, or performed by different devices.

The descriptions above are merely example embodiments of various concepts. They may be rearranged/divided/combined as desired, and one or more components or steps may be added or removed without departing from the spirit of the present disclosure.

We claim:

1. A method comprising:
   causing, by a computing device, display of a first user interface that prompts a user to capture an image indicating a beginning location for an exit route from a premises;
   receiving an indication to capture the image;
   causing the image to be captured via a camera of the computing device;
   determining, while a user is traversing the exit route, data points that define a path of the exit route;
   receiving an indication that an end of the exit route has been reached;
   storing, within a first data structure for the exit route, the image and the data points;
   causing, by the computing device and based on the indication that the end of the exit route has been reached, display of a second user interface that prompts the user to indicate a safe zone of the exit route;
   receiving an identification of the safe zone of the exit route; and
   storing, within the first data structure, information that indicates the safe zone.

2. The method of claim 1, further comprising:
   receiving, by the computing device, a selection of an object to identify along the path of the exit route; and
   storing, within the first data structure, data indicating the object.

3. The method of claim 2, wherein the object is a door of the premises.

4. The method of claim 2, wherein the object is a set of stairs of the premises or a stairwell of the premises.

5. The method of claim 1, further comprising:
   receiving, by the computing device, a selection of assistance information for the exit route; and
   storing, within the first data structure, the assistance information.

6. The method of claim 1, further comprising:
   causing, by the computing device, display of a second user interface that prompts the user to, using the camera, locate a floor of a room of the premises; and
   wherein determining the data points that define a path of the exit route is performed while the floor is present within image data captured by the camera.

7. The method of claim 1, further comprising:
   causing display of a second user interface that allows the user to share the exit route;
   causing display of a third user interface that prompts the user to enter a destination for a notification message associated with sharing the exit route;
   transmitting, to a device associated with the destination, the notification message; and
   transmitting, to a server, an indication that the exit route is to be shared with the destination.

8. The method of claim 7, wherein the notification message comprises a text message, and the destination comprises a phone number associated with the device.

9. The method of claim 1, wherein the data points comprise three-dimensional data points.

10. A method comprising:
    initiating, by a computing device, a process for assisting a user in traversing an exit route for a premises;
    causing, by the computing device, display of a first user interface that prompts a user to align a camera of the computing device with an image that indicates a beginning location of the exit route;

causing, by the computing device, display of a second user interface that overlays, onto first video captured from the camera, first graphics or first text, wherein the first graphics or the first text indicate a beginning of the exit route;

receiving, by the computing device, an indication of a safe zone of the exit route; and causing, by the computing device and based on the user traversing the exit route, display of one or more third user interfaces that overlay, onto second video captured from the camera, second graphics or second text, wherein the second graphics or the second text indicates at least the safe zone of the exit route.

11. The method of claim 10, wherein the second graphics or the second text is associated with a door along a path of the exit route.

12. The method of claim 10, wherein the second graphics or the second text is associated with a safe zone of the exit route.

13. The method of claim 10, wherein the second graphics or the second text is associated with a set of stairs along a path of the exit route or with a stairwell along the path of the exit route.

14. The method of claim 10, wherein a data structure for the exit route stores the image and stores the second graphics or the second text.

15. The method of claim 10, further comprising:

generating a distance estimate or a completion time estimate associated with the exit route; and causing the computing device to display the distance estimate or the completion time estimate.

16. The method of claim 10, further comprising identifying via image analysis performed by the computing device, a type of object along the exit route, wherein the type of object is a door object type or a stair object type.

17. A method comprising:

causing, by a computing device, display of a first user interface that presents a prompt to a user to capture an image thereby defining a beginning location for an exit route from a premises;

receiving an indication to capture the image;

causing the image to be captured via a camera of the computing device;

determining, while a user is traversing the exit route, data points that define a path of the exit route;

receiving an indication that an end of the exit route has been reached;

storing, within a first data structure for the exit route, the image and the data points;

causing, by the computing device, display of a second user interface that prompts the user to align the camera of the computing device with the image;

causing, by the computing device, display of a third user interface that overlays, onto first video captured from the camera, first graphics or first text, wherein the first graphics or the first text indicate a beginning of the exit route;

receiving, by the computing device, an identification of a safe zone of the exit route;

storing, within the first data structure, information that indicates the safe zone; and causing, by the computing device and based on the user traversing the exit route, display of one or more fourth user interfaces that overlay, onto second video captured from the camera, second graphics or second text, wherein the second graphics or the second text indicate information associated with the exit route and are based on the information indicating the safe zone.

18. The method of claim 17, further comprising:

causing, by the computing device and based on the indication that the end of the exit route has been reached, display of a fifth user interface that prompts the user to indicate the safe zone of the exit route.

19. The method of claim 17, further comprising:

receiving, by the computing device, a selection of assistance information for the exit route;

storing, within the first data structure, the assistance information; and wherein the second graphics or the second text is based on the assistance information.

20. The method of claim 17, further comprising:

causing display of a fourth user interface that allows the user to share the exit route;

causing display of a fifth user interface that prompts the user to enter a destination for a notification message associated with sharing the exit route;

transmitting, to a device associated with the destination, the notification message; and transmitting, to a server, an indication that the exit route is to be shared with the destination.

\* \* \* \* \*